United States Patent
Poupyrev

(10) Patent No.: US 9,921,660 B2
(45) Date of Patent: Mar. 20, 2018

(54) RADAR-BASED GESTURE RECOGNITION

(71) Applicant: Google Inc., Mountain View, CA (US)

(72) Inventor: Ivan Poupyrev, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 14/504,038

(22) Filed: Oct. 1, 2014

(65) Prior Publication Data

US 2016/0041617 A1 Feb. 11, 2016

Related U.S. Application Data

(60) Provisional application No. 62/034,581, filed on Aug. 7, 2014.

(51) Int. Cl.
| | |
|---|---|
| *G06F 3/01* | (2006.01) |
| *G06F 3/0346* | (2013.01) |
| *G01S 7/41* | (2006.01) |
| *G01S 13/04* | (2006.01) |
| *G01S 13/06* | (2006.01) |

(52) U.S. Cl.
CPC ............ *G06F 3/017* (2013.01); *G01S 7/415* (2013.01); *G01S 13/04* (2013.01); *G01S 13/06* (2013.01); *G06F 3/0346* (2013.01)

(58) Field of Classification Search
CPC .......... G06F 3/011; G06F 3/016; G06F 3/038; G06F 3/0338; G06F 3/03543
See application file for complete search history.

(56) References Cited

U.S. PATENT DOCUMENTS

| | | | |
|---|---|---|---|
| 3,610,874 | A | 10/1971 | Gagliano |
| 3,953,706 | A | 4/1976 | Harris et al. |
| 4,654,967 | A | 4/1987 | Thenner |
| 4,700,044 | A | 10/1987 | Hokanson et al. |
| 4,795,998 | A | 1/1989 | Dunbar et al. |
| 4,838,797 | A | 6/1989 | Dodier |

(Continued)

FOREIGN PATENT DOCUMENTS

| | | |
|---|---|---|
| CN | 202887794 | 4/2013 |
| CN | 103355860 | 1/2016 |

(Continued)

OTHER PUBLICATIONS

Zhadobov, Maxim et al., Millimeter-wave interactions with the human body: state of knowledge and recent advances, Apr. 2011, International Journal of Microwave and Wireless Technologies / vol. 3 / Special Issue 02, pp. 237-247.*

(Continued)

*Primary Examiner* — Kent Chang
*Assistant Examiner* — Nathan Brittingham
(74) *Attorney, Agent, or Firm* — Colby Nipper

(57) ABSTRACT

This document describes techniques using, and devices embodying, radar-based gesture recognition. These techniques and devices can enable a great breadth of gestures and uses for those gestures, such as gestures to use, control, and interact with computing and non-computing devices, from software applications to refrigerators. The techniques and devices are capable of providing a radar field that can sense gestures from multiple actors at one time and through obstructions, thereby improving gesture breadth and accuracy over many conventional techniques.

20 Claims, 8 Drawing Sheets

(56) References Cited

U.S. PATENT DOCUMENTS

| | | |
|---|---|---|
| 5,298,715 A | 3/1994 | Chalco et al. |
| 5,341,979 A | 8/1994 | Gupta |
| 5,454,043 A * | 9/1995 | Freeman ............ A61B 5/1121 345/419 |
| 5,468,917 A | 11/1995 | Brodsky et al. |
| 5,564,571 A | 10/1996 | Zanotti |
| 5,656,798 A | 8/1997 | Kubo et al. |
| 5,724,707 A | 3/1998 | Kirk et al. |
| 5,798,798 A | 8/1998 | Rector et al. |
| 6,032,450 A | 3/2000 | Blum |
| 6,080,690 A | 6/2000 | Lebby et al. |
| 6,210,771 B1 | 4/2001 | Post et al. |
| 6,254,544 B1 | 7/2001 | Hayashi |
| 6,313,825 B1 * | 11/2001 | Gilbert ................ G06F 3/011 345/156 |
| 6,340,979 B1 | 1/2002 | Beaton et al. |
| 6,386,757 B1 | 5/2002 | Konno |
| 6,440,593 B2 | 8/2002 | Ellison et al. |
| 6,492,980 B2 | 12/2002 | Sandbach |
| 6,493,933 B1 | 12/2002 | Post et al. |
| 6,513,970 B1 | 2/2003 | Tabata et al. |
| 6,543,668 B1 | 4/2003 | Fujii et al. |
| 6,616,613 B1 | 9/2003 | Goodman |
| 6,711,354 B2 | 3/2004 | Kameyama |
| 6,717,065 B2 | 4/2004 | Hosaka et al. |
| 6,802,720 B2 | 10/2004 | Weiss et al. |
| 6,835,898 B2 | 12/2004 | Eldridge et al. |
| 6,854,985 B1 | 2/2005 | Weiss |
| 6,929,484 B2 | 8/2005 | Weiss et al. |
| 7,134,879 B2 | 11/2006 | Sugimoto et al. |
| 7,194,371 B1 | 3/2007 | McBride et al. |
| 7,223,105 B2 | 5/2007 | Weiss et al. |
| 7,249,954 B2 | 7/2007 | Weiss |
| 7,299,964 B2 | 11/2007 | Jayaraman et al. |
| 7,310,236 B2 | 12/2007 | Takahashi et al. |
| 7,317,416 B2 | 1/2008 | Flom et al. |
| 7,348,285 B2 | 3/2008 | Dhawan et al. |
| 7,365,031 B2 | 4/2008 | Swallow et al. |
| 7,421,061 B2 | 9/2008 | Boese et al. |
| 7,462,035 B2 | 12/2008 | Lee et al. |
| 7,544,627 B2 | 6/2009 | Tao et al. |
| 7,578,195 B2 | 8/2009 | DeAngelis et al. |
| 7,644,488 B2 | 1/2010 | Aisenbrey |
| 7,647,093 B2 | 1/2010 | Bojovic et al. |
| 7,670,144 B2 | 3/2010 | Ito et al. |
| 7,677,729 B2 | 3/2010 | Vilser et al. |
| 7,691,067 B2 | 4/2010 | Westbrook et al. |
| 7,698,154 B2 | 4/2010 | Marchosky |
| 7,791,700 B2 | 9/2010 | Bellamy |
| 7,834,276 B2 | 11/2010 | Chou et al. |
| 7,952,512 B1 | 5/2011 | Delker et al. |
| 8,062,220 B2 | 11/2011 | Kurtz et al. |
| 8,169,404 B1 | 5/2012 | Boillot |
| 8,179,604 B1 | 5/2012 | Prada Gomez et al. |
| 8,199,104 B2 | 6/2012 | Park et al. |
| 8,282,232 B2 | 10/2012 | Hsu et al. |
| 8,289,185 B2 | 10/2012 | Alonso |
| 8,301,232 B2 | 10/2012 | Albert et al. |
| 8,334,226 B2 | 12/2012 | Nhan et al. |
| 8,341,762 B2 | 1/2013 | Balzano |
| 8,367,942 B2 | 2/2013 | Howell et al. |
| 8,475,367 B1 | 7/2013 | Yuen et al. |
| 8,505,474 B2 | 8/2013 | Kang et al. |
| 8,549,829 B2 | 10/2013 | Song et al. |
| 8,560,972 B2 | 10/2013 | Wilson |
| 8,569,189 B2 | 10/2013 | Bhattacharya et al. |
| 8,614,689 B2 | 12/2013 | Nishikawa et al. |
| 8,655,004 B2 | 2/2014 | Prest et al. |
| 8,700,137 B2 | 4/2014 | Albert |
| 8,758,020 B2 | 6/2014 | Burdea et al. |
| 8,759,713 B2 | 6/2014 | Sheats |
| 8,764,651 B2 | 7/2014 | Tran |
| 8,785,778 B2 | 7/2014 | Streeter et al. |
| 8,790,257 B2 | 7/2014 | Libbus et al. |
| 8,814,574 B2 | 8/2014 | Selby et al. |
| 9,055,879 B2 | 6/2015 | Selby et al. |
| 9,093,289 B2 | 7/2015 | Vicard et al. |
| 9,125,456 B2 | 9/2015 | Chow |
| 9,141,194 B1 | 9/2015 | Keyes et al. |
| 9,148,949 B2 | 9/2015 | Zhou et al. |
| 9,230,160 B1 | 1/2016 | Kanter |
| 9,331,422 B2 | 5/2016 | Nazzaro et al. |
| 9,335,825 B2 | 5/2016 | Rautianinen et al. |
| 9,508,141 B2 | 11/2016 | Khachaturian et al. |
| 9,575,560 B2 | 2/2017 | Poupyrev et al. |
| 9,588,625 B2 | 3/2017 | Poupyrev |
| 9,594,443 B2 | 3/2017 | VanBlon et al. |
| 9,600,080 B2 | 3/2017 | Poupyrev |
| 9,693,592 B2 | 7/2017 | Robinson et al. |
| 9,778,749 B2 | 10/2017 | Poupyrev |
| 2002/0080156 A1 | 6/2002 | Abbott et al. |
| 2002/0170897 A1 | 11/2002 | Hall |
| 2003/0100228 A1 | 5/2003 | Bungo et al. |
| 2003/0119391 A1 | 6/2003 | Swallow et al. |
| 2003/0122677 A1 | 7/2003 | Kail |
| 2004/0009729 A1 | 1/2004 | Hill et al. |
| 2004/0249250 A1 | 12/2004 | McGee et al. |
| 2004/0259391 A1 | 12/2004 | Jung et al. |
| 2005/0069695 A1 | 3/2005 | Jung et al. |
| 2005/0148876 A1 | 7/2005 | Endoh et al. |
| 2005/0248566 A1 * | 11/2005 | Vesely ................ G06T 15/10 345/419 |
| 2006/0035554 A1 | 2/2006 | Glaser et al. |
| 2006/0040739 A1 | 2/2006 | Wells |
| 2006/0157734 A1 | 7/2006 | Onodera et al. |
| 2006/0166620 A1 | 7/2006 | Sorensen |
| 2006/0258205 A1 | 11/2006 | Locher et al. |
| 2007/0026695 A1 | 2/2007 | Lee et al. |
| 2007/0118043 A1 | 5/2007 | Oliver et al. |
| 2007/0161921 A1 | 7/2007 | Rausch |
| 2007/0176821 A1 * | 8/2007 | Flom ................ G01S 13/89 342/25 A |
| 2007/0192647 A1 | 8/2007 | Glaser |
| 2007/0197878 A1 | 8/2007 | Shklarski |
| 2007/0210074 A1 | 9/2007 | Maurer et al. |
| 2008/0002027 A1 | 1/2008 | Kondo et al. |
| 2008/0024438 A1 | 1/2008 | Collins et al. |
| 2008/0065291 A1 | 3/2008 | Breed |
| 2008/0134102 A1 | 6/2008 | Movold et al. |
| 2008/0136775 A1 | 6/2008 | Conant |
| 2008/0168396 A1 | 7/2008 | Matas et al. |
| 2008/0194975 A1 | 8/2008 | MacQuarrie et al. |
| 2008/0211766 A1 | 9/2008 | Westerman et al. |
| 2008/0233822 A1 | 9/2008 | Swallow et al. |
| 2008/0282665 A1 | 11/2008 | Speleers |
| 2008/0291158 A1 * | 11/2008 | Park ................ G06F 3/014 345/156 |
| 2008/0303800 A1 | 12/2008 | Elwell |
| 2008/0316085 A1 | 12/2008 | Rofougaran et al. |
| 2008/0320419 A1 | 12/2008 | Matas et al. |
| 2009/0018408 A1 | 1/2009 | Ouchi et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0113298 A1 | 4/2009 | Jung et al. |
| 2009/0115617 A1 | 5/2009 | Sano et al. |
| 2009/0118648 A1 | 5/2009 | Kandori et al. |
| 2009/0149036 A1 | 6/2009 | Lee et al. |
| 2009/0177068 A1 | 7/2009 | Stivoric et al. |
| 2009/0203244 A1 | 8/2009 | Toonder |
| 2009/0270690 A1 | 10/2009 | Roos et al. |
| 2009/0288762 A1 | 11/2009 | Wolfel |
| 2009/0295712 A1 | 12/2009 | Ritzau |
| 2010/0065320 A1 | 3/2010 | Urano |
| 2010/0071205 A1 | 3/2010 | Graumann et al. |
| 2010/0094141 A1 | 4/2010 | Puswella |
| 2010/0103106 A1 * | 4/2010 | Chui ................ G06F 3/017 345/166 |
| 2010/0179820 A1 | 7/2010 | Harrison et al. |
| 2010/0201586 A1 | 8/2010 | Michalk |
| 2010/0205667 A1 | 8/2010 | Anderson et al. |
| 2010/0208035 A1 | 8/2010 | Pinault et al. |
| 2010/0225562 A1 | 9/2010 | Smith |

(56) References Cited

U.S. PATENT DOCUMENTS

| | | |
|---|---|---|
| 2010/0241009 A1 | 9/2010 | Petkie |
| 2010/0281438 A1* | 11/2010 | Latta .................. A63F 13/42 |
| | | 715/863 |
| 2010/0292549 A1 | 11/2010 | Schuler |
| 2010/0306713 A1* | 12/2010 | Geisner ............... G06F 3/0481 |
| | | 715/863 |
| 2010/0313414 A1 | 12/2010 | Sheats |
| 2010/0324384 A1 | 12/2010 | Moon et al. |
| 2010/0325770 A1 | 12/2010 | Chung et al. |
| 2011/0003664 A1 | 1/2011 | Richard |
| 2011/0010014 A1 | 1/2011 | Oexman et al. |
| 2011/0073353 A1 | 3/2011 | Lee et al. |
| 2011/0093820 A1* | 4/2011 | Zhang .................. A63F 13/06 |
| | | 715/863 |
| 2011/0181509 A1 | 7/2011 | Rautiainen et al. |
| 2011/0181510 A1 | 7/2011 | Hakala et al. |
| 2011/0197263 A1 | 8/2011 | Stinson, III |
| 2011/0202404 A1 | 8/2011 | van der Riet |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0245688 A1 | 10/2011 | Arora et al. |
| 2011/0279303 A1 | 11/2011 | Smith |
| 2011/0303341 A1 | 12/2011 | Meiss et al. |
| 2011/0307842 A1 | 12/2011 | Chiang et al. |
| 2011/0317871 A1* | 12/2011 | Tossell ............... G06K 9/00369 |
| | | 382/103 |
| 2011/0318985 A1 | 12/2011 | McDermid |
| 2012/0019168 A1* | 1/2012 | Noda .................. H05B 37/0227 |
| | | 315/307 |
| 2012/0029369 A1 | 2/2012 | Icove et al. |
| 2012/0047468 A1* | 2/2012 | Santos .................. G06F 3/011 |
| | | 715/863 |
| 2012/0068876 A1 | 3/2012 | Bangera et al. |
| 2012/0092284 A1* | 4/2012 | Rofougaran ............ G06F 3/017 |
| | | 345/173 |
| 2012/0123232 A1 | 5/2012 | Najarian et al. |
| 2012/0127082 A1 | 5/2012 | Kushler et al. |
| 2012/0144934 A1 | 6/2012 | Russell et al. |
| 2012/0156926 A1 | 6/2012 | Kato et al. |
| 2012/0174299 A1 | 7/2012 | Balzano |
| 2012/0174736 A1* | 7/2012 | Wang .................. G10H 1/0008 |
| | | 84/622 |
| 2012/0193801 A1 | 8/2012 | Gross et al. |
| 2012/0220835 A1 | 8/2012 | Chung |
| 2012/0248093 A1 | 10/2012 | Ulrich et al. |
| 2012/0254810 A1 | 10/2012 | Heck et al. |
| 2012/0268416 A1 | 10/2012 | Pirogov et al. |
| 2012/0280900 A1 | 11/2012 | Wang et al. |
| 2012/0310665 A1 | 12/2012 | Xu et al. |
| 2013/0016070 A1 | 1/2013 | Starner et al. |
| 2013/0035563 A1 | 2/2013 | Angellides |
| 2013/0046544 A1 | 2/2013 | Kay et al. |
| 2013/0053653 A1 | 2/2013 | Cuddihy et al. |
| 2013/0082922 A1 | 4/2013 | Miller |
| 2013/0083173 A1* | 4/2013 | Geisner ................ G06F 3/013 |
| | | 348/51 |
| 2013/0086533 A1 | 4/2013 | Stienstra |
| 2013/0102217 A1 | 4/2013 | Jeon |
| 2013/0104084 A1 | 4/2013 | Mlyniec et al. |
| 2013/0132931 A1 | 5/2013 | Bruns et al. |
| 2013/0150735 A1 | 6/2013 | Cheng |
| 2013/0161078 A1 | 6/2013 | Li |
| 2013/0194173 A1 | 8/2013 | Zhu et al. |
| 2013/0195330 A1* | 8/2013 | Kim .................. G06K 9/00201 |
| | | 382/128 |
| 2013/0196716 A1 | 8/2013 | Khurram |
| 2013/0207962 A1 | 8/2013 | Oberdorfer et al. |
| 2013/0278499 A1* | 10/2013 | Anderson ............... G06F 3/01 |
| | | 345/156 |
| 2013/0278501 A1* | 10/2013 | Bulzacki ................ G06F 3/017 |
| | | 345/157 |
| 2013/0283203 A1 | 10/2013 | Batraski et al. |
| 2013/0322729 A1 | 12/2013 | Mestha et al. |
| 2013/0332438 A1 | 12/2013 | Li et al. |
| 2013/0345569 A1 | 12/2013 | Mestha et al. |
| 2014/0005809 A1* | 1/2014 | Frei .................. H04L 29/1249 |
| | | 700/90 |
| 2014/0049487 A1 | 2/2014 | Konertz et al. |
| 2014/0051941 A1 | 2/2014 | Messerschmidt |
| 2014/0070957 A1 | 3/2014 | Longinotti-Buitoni et al. |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0121540 A1 | 5/2014 | Raskin |
| 2014/0135631 A1 | 5/2014 | Brumback et al. |
| 2014/0139422 A1 | 5/2014 | Mistry et al. |
| 2014/0139616 A1 | 5/2014 | Pinter et al. |
| 2014/0143678 A1 | 5/2014 | Mistry et al. |
| 2014/0184496 A1 | 7/2014 | Gribetz et al. |
| 2014/0191939 A1 | 7/2014 | Penn et al. |
| 2014/0200416 A1 | 7/2014 | Kashef et al. |
| 2014/0208275 A1 | 7/2014 | Mongia et al. |
| 2014/0215389 A1 | 7/2014 | Walsh et al. |
| 2014/0239065 A1 | 8/2014 | Zhou et al. |
| 2014/0244277 A1 | 8/2014 | Krishna Rao et al. |
| 2014/0246415 A1 | 9/2014 | Wittkowski |
| 2014/0250515 A1 | 9/2014 | Jakobsson |
| 2014/0253431 A1 | 9/2014 | Gossweiler et al. |
| 2014/0253709 A1 | 9/2014 | Bresch et al. |
| 2014/0262478 A1 | 9/2014 | Harris et al. |
| 2014/0275854 A1 | 9/2014 | Venkatraman et al. |
| 2014/0280295 A1 | 9/2014 | Kurochikin et al. |
| 2014/0281975 A1 | 9/2014 | Anderson |
| 2014/0297006 A1 | 10/2014 | Sadhu |
| 2014/0306936 A1* | 10/2014 | Dahl .................. G06F 3/0436 |
| | | 345/177 |
| 2014/0316261 A1 | 10/2014 | Lux et al. |
| 2014/0318699 A1 | 10/2014 | Longinotti-Buitoni et al. |
| 2014/0324888 A1 | 10/2014 | Xie et al. |
| 2014/0347295 A1 | 11/2014 | Kim et al. |
| 2014/0357369 A1* | 12/2014 | Callens ............... A63F 13/213 |
| | | 463/36 |
| 2015/0002391 A1 | 1/2015 | Chen |
| 2015/0009096 A1 | 1/2015 | Lee et al. |
| 2015/0026815 A1 | 1/2015 | Barrett |
| 2015/0029050 A1* | 1/2015 | Driscoll ................ H01Q 15/14 |
| | | 342/5 |
| 2015/0040040 A1 | 2/2015 | Balan et al. |
| 2015/0046183 A1 | 2/2015 | Cireddu |
| 2015/0068069 A1 | 3/2015 | Tran et al. |
| 2015/0077282 A1* | 3/2015 | Mohamadi ............. G01S 7/415 |
| | | 342/27 |
| 2015/0085060 A1* | 3/2015 | Fish .................... G06F 1/266 |
| | | 348/14.03 |
| 2015/0091858 A1 | 4/2015 | Rosenberg et al. |
| 2015/0099941 A1 | 4/2015 | Tran |
| 2015/0100328 A1 | 4/2015 | Kress et al. |
| 2015/0112606 A1 | 4/2015 | He et al. |
| 2015/0133017 A1 | 5/2015 | Liao et al. |
| 2015/0145805 A1 | 5/2015 | Liu |
| 2015/0162729 A1 | 6/2015 | Reversat et al. |
| 2015/0199045 A1 | 7/2015 | Robucci et al. |
| 2015/0261320 A1 | 9/2015 | Leto |
| 2015/0268027 A1 | 9/2015 | Gerdes |
| 2015/0268799 A1 | 9/2015 | Starner et al. |
| 2015/0277569 A1* | 10/2015 | Sprenger ............... G06F 3/017 |
| | | 345/156 |
| 2015/0280102 A1 | 10/2015 | Tajitsu et al. |
| 2015/0287187 A1 | 10/2015 | Redtel |
| 2015/0312041 A1 | 10/2015 | Choi |
| 2015/0332075 A1 | 11/2015 | Burch |
| 2015/0346820 A1* | 12/2015 | Poupyrev ............... G06F 3/014 |
| | | 345/156 |
| 2015/0375339 A1 | 12/2015 | Sterling et al. |
| 2016/0018948 A1 | 1/2016 | Parvarandeh et al. |
| 2016/0026253 A1 | 1/2016 | Bradski et al. |
| 2016/0038083 A1 | 2/2016 | Ding et al. |
| 2016/0041617 A1* | 2/2016 | Poupyrev ............... G06F 3/017 |
| | | 345/156 |

(56) References Cited

U.S. PATENT DOCUMENTS

| | | | |
|---|---|---|---|
| 2016/0041618 A1* | 2/2016 | Poupyrev | G01S 13/88 342/61 |
| 2016/0048235 A1 | 2/2016 | Poupyrev | |
| 2016/0048236 A1 | 2/2016 | Poupyrev | |
| 2016/0054792 A1 | 2/2016 | Poupyrev | |
| 2016/0054803 A1 | 2/2016 | Poupyrev | |
| 2016/0054804 A1 | 2/2016 | Gollakata et al. | |
| 2016/0055201 A1 | 2/2016 | Poupyrev et al. | |
| 2016/0098089 A1 | 4/2016 | Poupyrev | |
| 2016/0100166 A1* | 4/2016 | Dragne | H04N 19/124 375/240.03 |
| 2016/0103500 A1 | 4/2016 | Hussey et al. | |
| 2016/0106328 A1 | 4/2016 | Mestha et al. | |
| 2016/0145776 A1 | 5/2016 | Roh | |
| 2016/0213331 A1 | 7/2016 | Gil et al. | |
| 2016/0216825 A1 | 7/2016 | Forutanpour | |
| 2016/0220152 A1 | 8/2016 | Meriheina et al. | |
| 2016/0249698 A1 | 9/2016 | Berzowska et al. | |
| 2016/0259037 A1 | 9/2016 | Molchanov et al. | |
| 2016/0282988 A1 | 9/2016 | Poupyrev | |
| 2016/0283101 A1 | 9/2016 | Schwesig et al. | |
| 2016/0284436 A1 | 9/2016 | Fukuhara et al. | |
| 2016/0299526 A1 | 10/2016 | Inagaki et al. | |
| 2016/0320852 A1 | 11/2016 | Poupyrev | |
| 2016/0320853 A1 | 11/2016 | Lien et al. | |
| 2016/0320854 A1 | 11/2016 | Lien et al. | |
| 2016/0321428 A1 | 11/2016 | Rogers | |
| 2016/0338599 A1 | 11/2016 | DeBusschere et al. | |
| 2016/0345638 A1 | 12/2016 | Robinson et al. | |
| 2016/0349790 A1 | 12/2016 | Connor | |
| 2016/0349845 A1 | 12/2016 | Poupyrev et al. | |
| 2017/0060298 A1 | 3/2017 | Hwang et al. | |
| 2017/0097413 A1 | 4/2017 | Gillian et al. | |
| 2017/0097684 A1 | 4/2017 | Lien | |
| 2017/0115777 A1 | 4/2017 | Poupyrev | |
| 2017/0125940 A1 | 5/2017 | Karagozler et al. | |
| 2017/0232538 A1 | 8/2017 | Robinson et al. | |
| 2017/0249033 A1 | 8/2017 | Podhajny et al. | |

FOREIGN PATENT DOCUMENTS

| | | |
|---|---|---|
| DE | 102011075725 | 11/2012 |
| DE | 102013201359 | 7/2014 |
| EP | 0161895 | 11/1985 |
| EP | 1815788 | 8/2007 |
| EP | 3201726 | 8/2017 |
| GB | 2070469 | 9/1981 |
| GB | 2443208 | 4/2008 |
| JP | 2006234716 | 9/2006 |
| JP | 2011102457 | 5/2011 |
| WO | WO-9001895 | 3/1990 |
| WO | WO-0130123 | 4/2001 |
| WO | WO-2001027855 | 4/2001 |
| WO | WO-0175778 | 10/2001 |
| WO | WO-2002082999 | 10/2002 |
| WO | WO-2005033387 | 4/2005 |
| WO | WO-2007125298 | 11/2007 |
| WO | WO-2008061385 | 5/2008 |
| WO | WO-2009032073 | 3/2009 |
| WO | WO-2010032173 | 3/2010 |
| WO | WO-2012026013 | 3/2012 |
| WO | WO-2012152476 | 11/2012 |
| WO | WO-2013082806 | 6/2013 |
| WO | WO-2013084108 | 6/2013 |
| WO | WO-2013186696 | 12/2013 |
| WO | WO-2013191657 | 12/2013 |
| WO | WO-2013192166 | 12/2013 |
| WO | WO-2014019085 | 2/2014 |
| WO | WO-2014116968 | 7/2014 |
| WO | WO-2014124520 | 8/2014 |
| WO | WO-2014136027 | 9/2014 |
| WO | WO-2014138280 | 9/2014 |
| WO | WO-2014160893 | 10/2014 |
| WO | WO-2014165476 | 10/2014 |
| WO | WO-2014204323 | 12/2014 |
| WO | WO-2015017931 | 2/2015 |
| WO | WO-2015022671 | 2/2015 |
| WO | WO-2016053624 | 4/2016 |

OTHER PUBLICATIONS

"Philips Vital Signs Camera", Retrieved From: <http://www.vitalsignscamera.com/> Apr. 15, 2015, Jul. 17, 2013, 2 pages.

"Cardiio", Retrieved From: <http://www.cardiio.com/> Apr. 15, 2015 App Information Retrieved From: <https://itunes.apple.com/us/app/cardiio-touchless-camera-pulse/id542891434?Is=1&mt=8> Apr. 15, 2015, Feb. 24, 2015, 6 pages.

Balakrishnan,"Detecting Pulse from Head Motions in Video", In Proceedings: CVPR '13 Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, Jun. 23, 2013, 8 pages.

Couderc,"Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, Jan. 2015, 7 pages.

Poh,"A Medical Mirror for Non-contact Health Monitoring", In Proceedings: ACM SIGGRAPH Emerging Technologies Available at: <http://affect.media.mit.edu/pdfs/11.Poh-etal-SIGGRAPH.pdf>, 2011, 1 page.

Poh,"Non-contact, Automated Cardiac Pulse Measurements Using Video Imaging and Blind Source Separation.", In Proceedings: Optics Express, vol. 18, No. 10 Available at: <http://www.opticsinfobase.org/view_article.cfm?gotourl=http%3A%2F%2Fwww%2Eopticsinfobase%2Eorg%2FDirect-PDFAccess%2F77B04D55%2DBC95%2D6937%2D5BAC49A-426378C02%5F199381%2Foe%2D18%2D10%2D10762%2Ep, May 7, 2010, 13 pages.

Wang,"Exploiting Spatial Redundancy of Image Sensor for Motion Robust rPPG", In Proceedings: IEEE Transactions on Biomedical Engineering, vol. 62, Issue 2, Jan. 19, 2015, 11 pages.

"International Search Report and Written Opinion", Application No. PCT/US2015/043963, dated Nov. 24, 2015, 16 pages.

"International Search Report and Written Opinion", Application No. PCT/US2015/043949, dated Dec. 1, 2015, 18 pages.

Zhadobov,"Millimeter-wave Interactions with the Human Body: State of Knowledge and Recent Advances", International Journal of Microwave and Wireless Technologies, Mar. 1, 2011, 11 pages.

He, "A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, Feb. 2013, 137 pages.

Nakajima, et al.,' "Development of Real-Time Image Sequence Analysis for Evaluating Posture Change and Respiratory Rate of a Subject in Bed", In Proceedings: Physiological Measurement, vol. 22, No. 3, Retrieved From: <http://iopscience.iop.org/0967-3334/22/3/401/pdf/0967-3334_22_3_401.pdf> Feb. 27, 2015, Aug. 2001, 8 pages.

"International Search Report and Written Opinion", Application No. PCT/US2016/029820, dated Jul. 15, 2016, 14 pages.

"Non-Final Office Action", U.S. Appl. No. 14/582,896, dated Jun. 29, 2016, 9 pages.

"Non-Final Office Action", U.S. Appl. No. 14/681,625, dated Aug. 12, 2016, 9 pages.

"Restriction Requirement", U.S. Appl. No. 14/666,155, dated Jul. 22, 2016, 5 pages.

"The Instant Blood Pressure app estimates blood pressure with your smartphone and our algorithm", Retrieved at: http://www.instantbloodpressure.com/—on Jun. 23, 2016, 6 pages.

"International Search Report and Written Opinion", Application No. PCT/US2015/050903, dated Feb. 19, 2016, 18 pages.

Pu, "Whole-Home Gesture Recognition Using Wireless Signals", MobiCom '13 Proceedings of the 19th annual international conference on Mobile computing & networking, Aug. 27, 2013, 12 pages.

(56) References Cited

OTHER PUBLICATIONS

"Extended European Search Report", EP Application No. 15170577.9, dated Nov. 5, 2015, 12 pages.
"Final Office Action", U.S. Appl. No. 14/312,486, dated Jun. 3, 2016, 32 pages.
"Final Office Action", U.S. Appl. No. 14/504,061, dated Mar. 9, 2016, 10 pages.
"Final Office Action", U.S. Appl. No. 14/681,625, dated Dec. 7, 2016, 10 pages.
"Frogpad Introduces Wearable Fabric Keyboard with Bluetooth Technology", Retrieved From: <http://www.geekzone.co.nz/content.asp?contentid=3898> Mar. 16, 2015, Jan. 7, 2005, 2 pages.
"International Search Report and Written Opinion", Application No. PCT/US2015/044774, dated Nov. 3, 2015, 12 pages.
"International Search Report and Written Opinion", Application No. PCT/US2016/024267, dated Jun. 20, 2016, 13 pages.
"International Search Report and Written Opinion", Application No. PCT/US2016/024273, dated Jun. 20, 2016, 13 pages.
"International Search Report and Written Opinion", Application No. PCT/US2016/024289, dated Aug. 25, 2016, 17 pages.
"International Search Report and Written Opinion", Application No. PCT/US2016/033342, dated Oct. 27, 2016, 20 pages.
"Non-Final Office Action", U.S. Appl. No. 14/312,486, dated Oct. 23, 2015, 25 pages.
"Non-Final Office Action", U.S. Appl. No. 14/504,061, dated Nov. 4, 2015, 8 pages.
"Notice of Allowance", U.S. Appl. No. 14/582,896, dated Nov. 7, 2016, 5 pages.
Arbabian,"A 94GHz mm-Wave to Baseband Pulsed-Radar for Imaging and Gesture Recognition", 2012 IEEE, 2012 Symposium on VLSI Circuits Digest of Technical Papers, 2012, 2 pages.
Cheng,"Smart Textiles: From Niche to Mainstream", IEEE Pervasive Computing, Jul. 2013, pp. 81-84.
Farringdon,"Wearable Sensor Badge & Sensor Jacket for Context Awareness", Third International Symposium on Wearable Computers, Oct. 1999, 7 pages.
Holleis,"Evaluating Capacitive Touch Input on Clothes", Proceedings of the 10th International Conference on Human Computer Interaction, Jan. 1, 2008, 10 pages.
Matthews,"Venous Pulse", Retrieved at: http://www.rjmatthewsmd.com/Definitions/venous_pulse.htm—on Nov. 30, 2016, Apr. 13, 2013, 7 pages.
Patel,"Applications of Electrically Conductive Yarns in Technical Textiles", International Conference on Power System Technology (POWECON), Oct. 30, 2012, 6 pages.
Schneegass,"Towards a Garment OS: Supporting Application Development for Smart Garments", Wearable Computers, ACM, Sep. 2014, 6 pages.
Wijesiriwardana,"Capacitive Fibre-Meshed Transducer for Touch & Proximity Sensing Applications", IEEE Sensors Journal, IEEE Service Center, Oct. 1, 2005, 5 pages.
Zhang,"Study of the Structural Design and Capacitance Characteristics of Fabric Sensor", Advanced Materials Research (vols. 194-196), Feb. 21, 2011, 8 pages.
"Corrected Notice of Allowance", U.S. Appl. No. 14/504,061, dated Dec. 27, 2016, 2 pages.
"Corrected Notice of Allowance", U.S. Appl. No. 14/582,896, dated Dec. 19, 2016, 2 pages.
"International Search Report and Written Opinion", Application No. PCT/US2016/042013, dated Oct. 26, 2016, 12 pages.
"Non-Final Office Action", U.S. Appl. No. 14/504,121, dated Jan. 9, 2017, 13 pages.
"Combined Search and Examination Report", GB Application No. 1620892.8, dated Apr. 6, 2017, 5 pages.
"Combined Search and Examination Report", GB Application No. 1620891.0, dated May 31, 2017, 9 pages.
"Corrected Notice of Allowance", U.S. Appl. No. 14/930,220, dated Mar. 20, 2017, 2 pages.
"Corrected Notice of Allowance", U.S. Appl. No. 14/930,220, dated May 11, 2017, 2 pages.
"Final Office Action", U.S. Appl. No. 14/518,863, dated May 5, 2017, 18 pages.
"First Action Interview Office Action", U.S. Appl. No. 14/959,901, dated Apr. 14, 2017, 3 pages.
"International Preliminary Report on Patentability", Application No. PCT/US2015/050903, dated Apr. 13, 2017, 12 pages.
"International Search Report and Written Opinion", Application No. PCT/US2016/060399, dated Jan. 30, 2017, 11 pages.
"International Search Report and Written Opinion", Application No. PCT/US2016/063874, dated May 11, 2017, 19 pages.
"Non-Final Office Action", U.S. Appl. No. 15/403,066, dated May 4, 2017, 31 pages.
"Notice of Allowance", U.S. Appl. No. 14/494,863, dated May 30, 2017, 7 pages.
"Notice of Allowance", U.S. Appl. No. 14/681,625, dated Jun. 7, 2017, 7 pages.
"Pre-Interview Communication", U.S. Appl. No. 14/715,454, dated Apr. 14, 2017, 3 pages.
"Pre-Interview Communication", U.S. Appl. No. 14/715,793, dated Mar. 20, 2017, 3 pages.
"Pre-Interview Communication", U.S. Appl. No. 15/343,067, dated Apr. 19, 2017, 3 pages.
"Textile Wire Brochure", Retrieved at: http://www.textile-wire.ch/en/home.html, Aug. 7, 2004, 17 pages.
Stoppa,"Wearable Electronics and Smart Textiles: A Critical Review", In Proceedings of Sensors, vol. 14, Issue 7, Jul. 7, 2014, pp. 11957-11992.
"Corrected Notice of Allowance", U.S. Appl. No. 14/312,486, dated Jan. 23, 2017, 4 pages.
"Corrected Notice of Allowance", U.S. Appl. No. 14/582,896, dated Feb. 6, 2017, 2 pages.
"Corrected Notice of Allowance", U.S. Appl. No. 14/582,896, dated Feb. 23, 2017, 2 pages.
"International Preliminary Report on Patentability", Application No. PCT/US2015/043963, dated Feb. 16, 2017, 12 pages.
"International Preliminary Report on Patentability", Application No. PCT/US2015/030388, dated Dec. 15, 2016, 12 pages.
"International Preliminary Report on Patentability", Application No. PCT/US2015/043949, dated Feb. 16, 2017, 13 pages.
"International Preliminary Report on Patentability", Application No. PCT/US2015/044774, dated Mar. 2, 2017, 8 pages.
"International Search Report and Written Opinion", Application No. PCT/US2016/062082, dated Feb. 23, 2017, 12 pages.
"International Search Report and Written Opinion", Application No. PCT/US2016/055671, dated Dec. 1, 2016, 14 pages.
"Life:X Lifestyle eXplorer", Retrieved from <https://web.archive.org/web/20150318093841/http://research.microsoft.com/en-us/projects/lifex >, Feb. 3, 2017, 2 pages.
"Non-Final Office Action", U.S. Appl. No. 14/504,139, dated Jan. 27, 2017, 10 pages.
"Non-Final Office Action", U.S. Appl. No. 14/513,875, dated Feb. 21, 2017, 9 pages.
"Non-Final Office Action", U.S. Appl. No. 14/666,155, dated Feb. 3, 2017, 12 pages.
"Non-Final Office Action", U.S. Appl. No. 14/681,625, dated Mar. 6, 2017, 7 pages.
"Non-Final Office Action", U.S. Appl. No. 14/874,955, dated Feb. 27, 2017, 8 pages.
"Non-Final Office Action", U.S. Appl. No. 14/959,799, dated Jan. 27, 2017, 10 pages.
"Non-Final Office Action", U.S. Appl. No. 15/398,147, dated Mar. 9, 2017, 10 pages.
"Notice of Allowance", U.S. Appl. No. 14/930,220, dated Feb. 2, 2017, 8 pages.
"Pre-Interview Communication", U.S. Appl. No. 14/494,863, dated Jan. 27, 2017, 5 pages.
"Pre-Interview Communication", U.S. Appl. No. 14/959,730, dated Feb. 15, 2017, 3 pages.
"Pre-Interview Communication", U.S. Appl. No. 14/959,901, dated Feb. 10, 2017, 3 pages.
"The Dash smart earbuds play back music, and monitor your workout", Retrieved from <http://newatlas.com/bragi-dash-tracking-earbuds/30808/>, Feb. 13, 2014, 3 pages.

(56) References Cited

OTHER PUBLICATIONS

Palese,"The Effects of Earphones and Music on the Temperature Measured by Infrared Tympanic Thermometer: Preliminary Results", ORL—head and neck nursing: official journal of the Society of Otorhinolaryngology and Head-Neck Nurses 32.2, 2013, pp. 8-12.
"Corrected Notice of Allowance", U.S. Appl. No. 14/312,486, dated Oct. 28, 2016, 4 pages.
"International Search Report and Written Opinion", Application No. PCT/US2016/032307, dated Aug. 25, 2016, 13 pages.
"International Search Report and Written Opinion", Application No. PCT/US2016/030177, dated Aug. 2, 2016, 15 pages.
"International Search Report and Written Opinion", Application No. PCT/US2016/030115, dated Aug. 8, 2016, 18 pages.
"Non-Final Office Action", U.S. Appl. No. 14/518,863, dated Oct. 14, 2016, 16 pages.
"Non-Final Office Action", U.S. Appl. No. 14/666,155, dated Aug. 24, 2016, 9 pages.
"Non-Final Office Action", U.S. Appl. No. 14/930,220, dated Sep. 14, 2016, 15 pages.
"Notice of Allowance", U.S. Appl. No. 14/312,486, dated Oct. 7, 2016, 15 pages.
"Notice of Allowance", U.S. Appl. No. 14/504,061, dated Sep. 12, 2016, 7 pages.
"Pre-Interview Communication", U.S. Appl. No. 14/513,875, dated Oct. 21, 2016, 3 pages.
Espina,"Wireless Body Sensor Network for Continuous Cuff-less Blood Pressure Monitoring", International Summer School on Medical Devices and Biosensors, 2006, Sep. 2006, 5 pages.
Godana,"Human Movement Characterization in Indoor Environment using GNU Radio Based Radar", Retrieved at: http://repository.tudelft.nl/islandora/object/uuid:414e1868-dd00-4113-9989-4c213f1f7094?collection=education, Nov. 30, 2009, 100 pages.
Pu,"Gesture Recognition Using Wireless Signals", Oct. 2014, pp. 15-18.
Wang,"Micro-Doppler Signatures for Intelligent Human Gait Recognition Using a UWB Impulse Radar", 2011 IEEE International Symposium on Antennas and Propagation (APSURSI), Jul. 3, 2011, pp. 2103-2106.
"Final Office Action", U.S. Appl. No. 15/403,066, dated Oct. 5, 2017, 31 pages.
"Foreign Office Action", KR Application No. 10-2016-7035397, dated Oct. 5, 2017, 5 pages.
"Foreign Office Action", JP Application No. 2016567813, dated Sep. 22, 2017, 8 pages.
"International Preliminary Report on Patentability", PCT Application No. PCT/US2016/026756, dated Oct. 19, 2017, 8 pages.
"Non-Final Office Action", U.S. Appl. No. 14/518,863, dated Sep. 29, 2017, 20 pages.
"Non-Final Office Action", U.S. Appl. No. 15/142,689, dated Oct. 4, 2017, 18 pages.
"Non-Final Office Action", U.S. Appl. No. 14/504,139, dated Oct. 18, 2017, 12 pages.
"Non-Final Office Action", U.S. Appl. No. 14/699,181, dated Oct. 18, 2017, 33 pages.
"Non-Final Office Action", U.S. Appl. No. 15/595,649, dated Oct. 31, 2017, 16 pages.
"Notice of Allowance", U.S. Appl. No. 14/874,955, dated Oct. 20, 2017, 7 pages.
"Notice of Allowance", U.S. Appl. No. 14/681,625, dated Oct. 23, 2017, 8 pages.
"Pre-Interview Office Action", U.S. Appl. No. 14/862,409, dated Sep. 15, 2017, 16 pages.
"Advisory Action", U.S. Appl. No. 14/504,139, dated Aug. 28, 2017, 3 pages.
"Final Office Action", U.S. Appl. No. 15/398,147, dated Jun. 30, 2017, 11 pages.
"Final Office Action", U.S. Appl. No. 14/874,955, dated Jun. 20, 2017, 9 pages.
"Final Office Action", U.S. Appl. No. 14/959,799, dated Jul. 19, 2017, 12 pages.
"Final Office Action", U.S. Appl. No. 14/504,121, dated Aug. 8, 2017, 16 pages.
"Final Office Action", U.S. Appl. No. 14/959,901, dated Aug. 25, 2017, 19 pages.
"Final Office Action", U.S. Appl. No. 14/715,454, dated Sep. 7, 2017, 14 pages.
"Final Office Action", U.S. Appl. No. 14/715,793, dated Sep. 27, 2017, 7 pages.
"First Action Interview OA", U.S. Appl. No. 14/715,793, dated Jun. 21, 2017, 3 pages.
"First Action Interview Pilot Program Pre-Interview Communication", U.S. Appl. No. 14/731,195, dated Aug. 1, 2017, 3 pages.
"Non-Final Office Action", U.S. Appl. No. 14/720,632, dated Jun. 14, 2017, 16 pages.
"Non-Final Office Action", U.S. Appl. No. 14/862,409, dated Jun. 22, 2017, 15 pages.
"Non-Final Office Action", U.S. Appl. No. 14/959,730, dated Jun. 23, 2017, 14 pages.
"Non-Final Office Action", U.S. Appl. No. 15/093,533, dated Aug. 24, 2017, 18 pages.
"Non-Final Office Action", U.S. Appl. No. 15/142,619, dated Aug. 25, 2017, 16 pages.
"Non-Final Office Action", U.S. Appl. No. 14/959,799, dated Sep. 8, 2017, 16 pages.
"Non-Final Office Action", U.S. Appl. No. 15/398,147, dated Sep. 8, 2017, 7 pages.
"Notice of Allowance", U.S. Appl. No. 14/513,875, dated Jun. 28, 2017, 7 pages.
"Notice of Allowance", U.S. Appl. No. 14/666,155, dated Jul. 10, 2017, 7 pages.
"Notice of Allowance", U.S. Appl. No. 15/343,067, dated Jul. 27, 2017, 9 pages.
Otto, et al., "System Architecture of a Wireless Body Area Sensor Network for Ubiquitous Health Monitoring", Journal of Mobile Multimedia; vol. 1, No. 4, Jan, 10, 2006, 20 pages.

* cited by examiner

RADAR-BASED GESTURE RECOGNITION

PRIORITY APPLICATION

This application claims priority under 35 U.S.C. § 119(e) to U.S. Provisional Patent Application No. 62/034,581, entitled "Radar-Based Gesture Recognition" and filed on Aug. 7, 2014, the disclosure of which is incorporated in its entirety by reference herein.

BACKGROUND

Use of gestures to interact with computing devices has become increasingly common. Gesture recognition techniques have successfully enabled gesture interaction with devices when these gestures are made to device surfaces, such as touch screens for phones and tablets and touch pads for desktop computers. Users, however, are more and more often desiring to interact with their devices through gestures not made to a surface, such as a person waving an arm to control a video game. These in-the-air gestures are difficult for current gesture-recognition techniques to accurately recognize.

SUMMARY

This document describes techniques and devices for radar-based gesture recognition. These techniques and devices can accurately recognize gestures that are made in three dimensions, such as in-the-air gestures. These in-the-air gestures can be made from varying distances, such as from a person sitting on a couch to control a television, a person standing in a kitchen to control an oven or refrigerator, or millimeters from a desktop computer's display.

Furthermore, the described techniques may use a radar field to sense gestures, which can improve accuracy by differentiating between clothing and skin, penetrating objects that obscure gestures, and identifying different actors.

This summary is provided to introduce simplified concepts concerning radar-based gesture recognition, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for radar-based gesture recognition are described with reference to the following drawings. The same numbers are used throughout the drawings to reference like features and components.

DETAILED DESCRIPTION

Overview

This document describes techniques using, and devices embodying, radar-based gesture recognition. These techniques and devices can enable a great breadth of gestures and uses for those gestures, such as gestures to use, control, and interact with various devices, from desktops to refrigerators. The techniques and devices are capable of providing a radar field that can sense gestures from multiple actors at one time and through obstructions, thereby improving gesture breadth and accuracy over many conventional techniques.

This document now turns to an example environment, after which example radar-based gesture-recognition systems and radar fields, example methods, and an example computing system are described.

Example Environment

Figure 1:
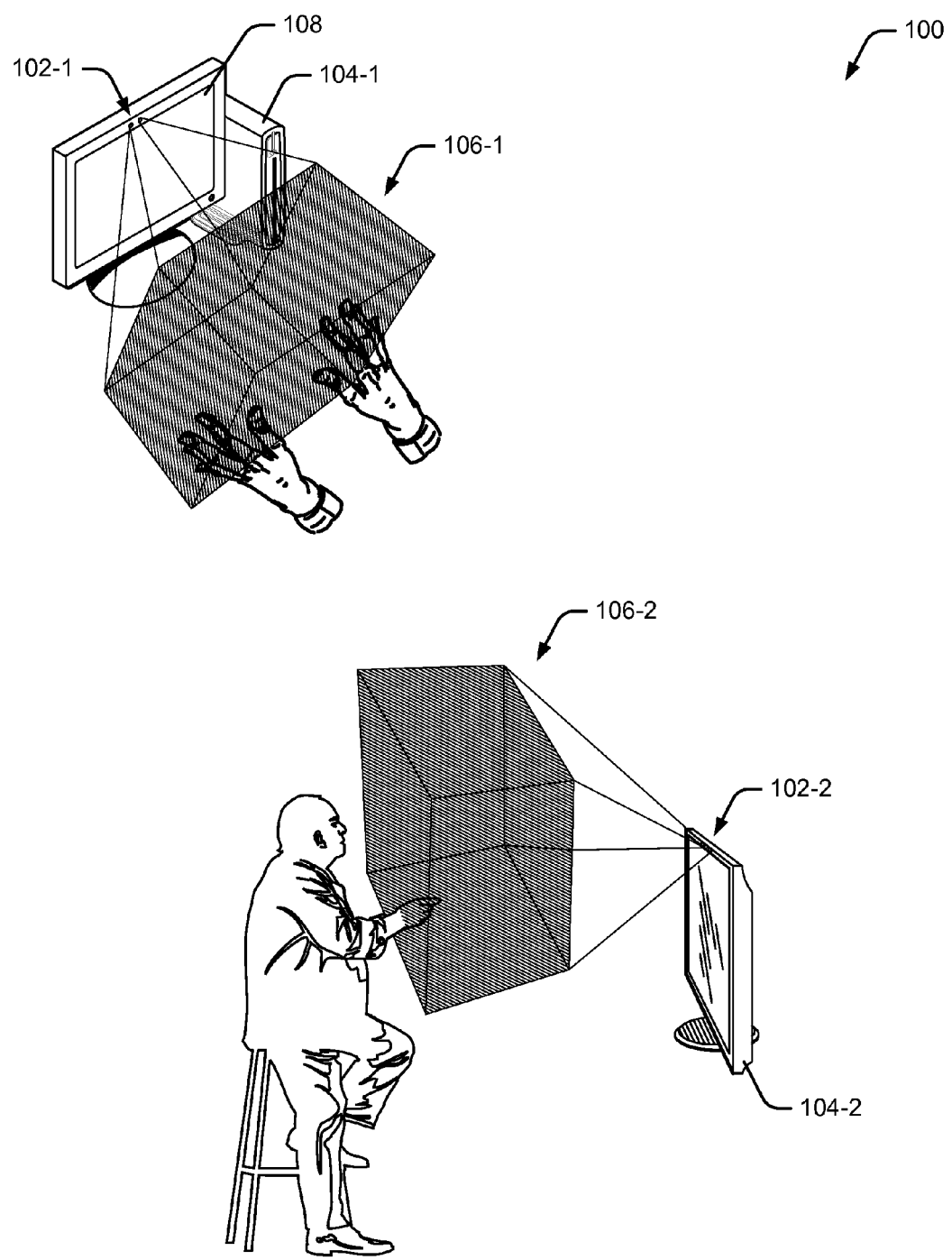
FIG. 1 illustrates an example environment in which radar-based gesture recognition can be implemented.

FIG. 1 is an illustration of example environment 100 in which techniques using, and an apparatus including, a radar-based gesture-recognition system may be embodied. Environment 100 includes two example devices and manners for using radar-based gesture-recognition system 102, in the first, radar-based gesture-recognition system 102-1 provides a near radar field to interact with one of computing devices 104, desktop computer 104-1, and in the second, radar-based gesture-recognition system 102-2 provides an intermediate radar field (e.g., a room size) to interact with television 104-2. These radar-based gesture-recognition systems 102-1 and 102-2 provide radar fields 106, near radar field 106-1 and intermediate radar field 106-2, and are described below.

Desktop computer 104-1 includes, or is associated with, radar-based gesture-recognition system 102-1. These devices work together to improve user interaction with desktop computer 104-1. Assume, for example, that desktop computer 104-1 includes a touch screen 108 through which display and user interaction can be performed. This touch screen 108 can present some challenges to users, such as needing a person to sit in a particular orientation, such as upright and forward, to be able to touch the screen. Further, the size for selecting controls through touch screen 108 can make interaction difficult and time-consuming for some users. Consider, however, radar-based gesture-recognition system 102-1, which provides near radar field 106-1 enabling a user's hands to interact with desktop computer 104-1, such as with small or large, simple or complex gestures, including those with one or two hands, and in three dimensions. As is readily apparent, a large volume through which a user may make selections can be substantially easier and provide a better experience over a flat surface, such as that of touch screen 108.

Similarly, consider radar-based gesture-recognition system 102-2, which provides intermediate radar field 106-2, which enables a user to interact with television 104-2 from a distance and through various gestures, from hand gestures, to arm gestures, to full-body gestures. By so doing, user selections can be made simpler and easier than a flat surface (e.g., touch screen 108), a remote control (e.g., a gaming or television remote), and other conventional control mechanisms.

Radar-based gesture-recognition systems 102 can interact with applications or an operating system of computing devices 104, or remotely through a communication network by transmitting input responsive to recognizing gestures. Gestures can be mapped to various applications and devices, thereby enabling control of many devices and applications. Many complex and unique gestures can be recognized by radar-based gesture-recognition systems 102, thereby permitting precise and/or single-gesture control, even for multiple applications. Radar-based gesture-recognition systems 102, whether integrated with a computing device, having computing capabilities, or having few computing abilities, can each be used to interact with various devices and applications.

Figure 2:
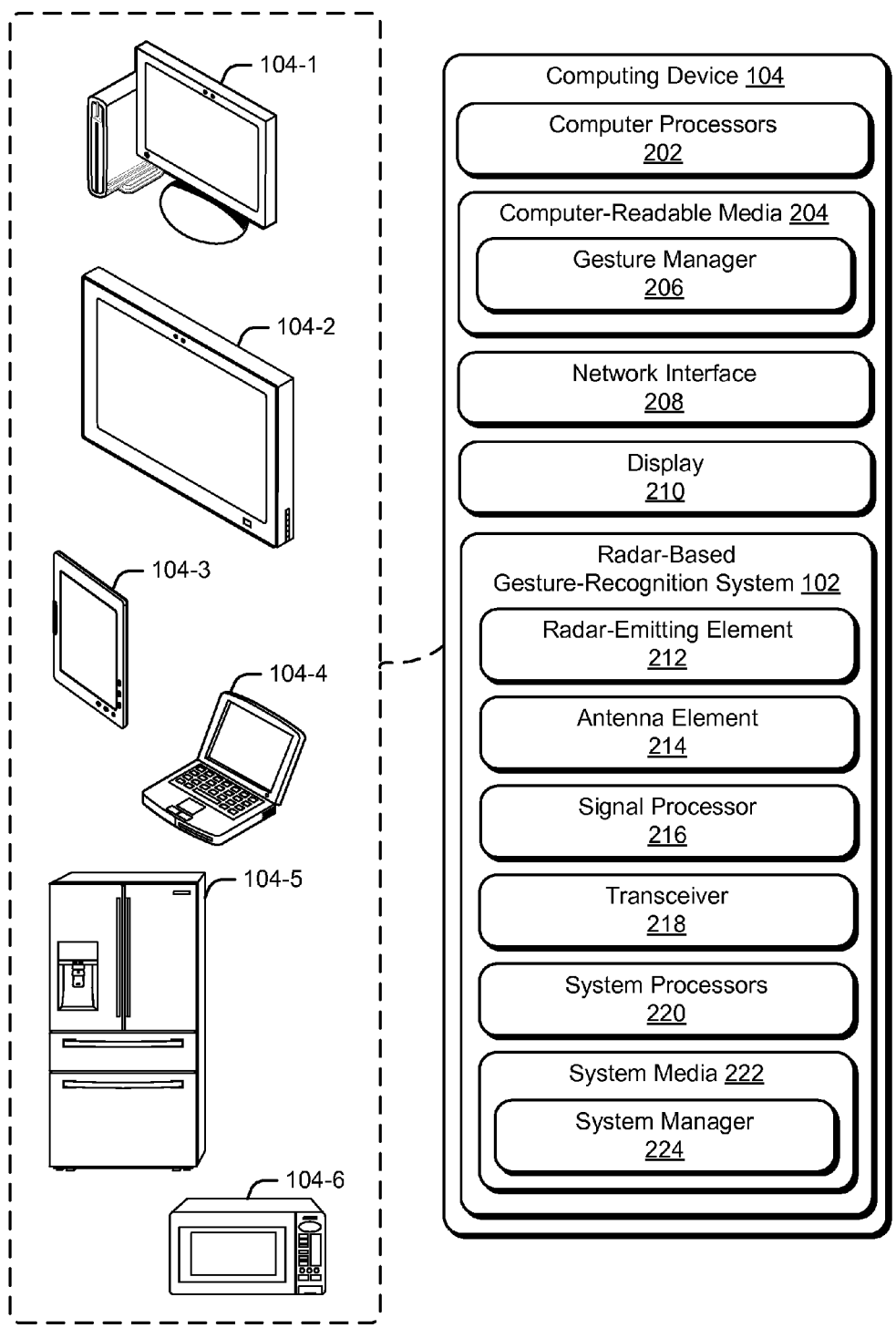
FIG. 2 illustrates the radar-based gesture-recognition system and computing device of FIG. 1 in detail.

In more detail, consider FIG. 2, which illustrates radar-based gesture-recognition system 102 as part of one of computing device 104. Computing device 104 is illustrated with various non-limiting example devices, the noted desktop computer 104-1, television 104-2, as well as tablet 104-3, laptop 104-4, refrigerator 104-5, and microwave 104-6, though other devices may also be used, such as home automation and control systems, entertainment systems, audio systems, other home appliances, security systems, netbooks, smartphones, and e-readers. Note that computing device 104 can be wearable, non-wearable but mobile, or relatively immobile (e.g., desktops and appliances).

Note also that radar-based gesture-recognition system 102 can be used with, or embedded within, many different computing devices or peripherals, such as in walls of a home to control home appliances and systems (e.g., automation control panel), in automobiles to control internal functions (e.g., volume, cruise control, or even driving of the car), or as an attachment to a laptop computer to control computing applications on the laptop.

Further, radar field 106 can be invisible and penetrate some materials, such as textiles, thereby further expanding how the radar-based gesture-recognition system 102 can be used and embodied. While examples shown herein generally show one radar-based gesture-recognition system 102 per device, multiples can be used, thereby increasing a number and complexity of gestures, as well as accuracy and robust recognition.

Computing device 104 includes one or more computer processors 202 and computer-readable media 204, which includes memory media and storage media. Applications and/or an operating system (not shown) embodied as computer-readable instructions on computer-readable media 204 can be executed by processors 202 to provide some of the functionalities described herein. Computer-readable media 204 also includes gesture manager 206 (described below).

Computing device 104 may also include network interfaces 208 for communicating data over wired, wireless, or optical networks and display 210. By way of example and not limitation, network interface 208 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like.

Radar-based gesture-recognition system 102, as noted above, is configured to sense gestures. To enable this, radar-based gesture-recognition system 102 includes a radar-emitting element 212, an antenna element 214, and a signal processor 216.

Generally, radar-emitting element 212 is configured to provide a radar field, in some cases one that is configured to penetrate fabric or other obstructions and reflect from human tissue. These fabrics or obstructions can include wood, glass, plastic, cotton, wool, nylon and similar fibers, and so forth, while reflecting from human tissues, such as a person's hand.

This radar field can be a small size, such as zero or one or so millimeters to 1.5 meters, or an intermediate size, such as about one to about 30 meters. In the intermediate size, antenna element 214 or signal processor 216 are configured to receive and process reflections of the radar field to provide large-body gestures based on reflections from human tissue caused by body, arm, or leg movements, though smaller and more-precise gestures can be sensed as well. Example intermediate-sized radar fields include those in which a user makes gestures to control a television from a couch, change a song or volume from a stereo across a room, turn off an oven or oven timer (a near field would also be useful here), turn lights on or off in a room, and so forth.

Radar-emitting element 212 can instead be configured to provide a radar field from little if any distance from a computing device or its display. An example near field is illustrated in FIG. 1 at near radar field 106-1 and is configured for sensing gestures made by a user using a laptop, desktop, refrigerator water dispenser, and other devices where gestures are desired to be made near to the device.

Radar-emitting element 212 can be configured to emit continuously modulated radiation, ultra-wideband radiation, or sub-millimeter-frequency radiation. Radar-emitting element 212, in some cases, is configured to form radiation in beams, the beams aiding antenna element 214 and signal processor 216 to determine which of the beams are interrupted, and thus locations of interactions within the radar field.

Antenna element 214 is configured to receive reflections of, or sense interactions in, the radar field. In some cases, reflections include those from human tissue that is within the radar field, such as a hand or arm movement. Antenna element 214 can include one or many antennas or sensors, such as an array of radiation sensors, the number in the array based on a desired resolution and whether the field is a surface or volume.

Signal processor 216 is configured to process the received reflections within the radar field to provide gesture data usable to determine a gesture. Antenna element 214 may, in some cases, be configured to receive reflections from multiple human tissue targets that are within the radar field and signal processor 216 be configured to process the received interactions sufficient to differentiate one of the multiple human tissue targets from another of the multiple human tissue targets. These targets may include hands, arms, legs, head, and body, from a same or different person. By so doing, multi-person control, such as with a video game being played by two people at once, is enabled.

The field provided by radar-emitting element 212 can be a three-dimensional (3D) volume (e.g., hemisphere, cube, volumetric fan, cone, or cylinder) to sense in-the-air gestures, though a surface field (e.g., projecting on a surface of a person) can instead be used. Antenna element 214 is configured, in some cases, to receive reflections from interactions in the radar field of two or more targets (e.g., fingers, arms, or persons), and signal processor 216 is configured to process the received reflections sufficient to provide gesture data usable to determine gestures, whether for a surface or in a 3D volume. Interactions in a depth dimension, which can be difficult for some conventional techniques, can be accurately sensed by the radar-based gesture-recognition system 102.

To sense gestures through obstructions, radar-emitting element 212 can also be configured to emit radiation capable of substantially penetrating fabric, wood, and glass. Antenna element 214 is configured to receive the reflections from the human tissue through the fabric, wood, or glass, and signal processor 216 configured to analyze the received reflections as gestures even with the received reflections partially affected by passing through the obstruction twice. For example, the radar passes through a fabric layer interposed between the radar emitter and a human arm, reflects off the human arm, and then back through the fabric layer to the antenna element.

Example radar fields are illustrated in FIG. 1, one of which is near radar field 106-1, which is emitted by radar-based gesture-recognition system 102-1 of desktop computer 104-1. With near radar field 106-1, a user may perform complex or simple gestures with his or her hand or hands (or a device like a stylus) that interrupts the radar field. Example gestures include the many gestures usable with current touch-sensitive displays, such as swipes, two-finger pinch, spread, and rotate, tap, and so forth. Other gestures are enabled that are complex, or simple but three-dimensional, examples include the many sign-language gestures, e.g., those of American Sign Language (ASL) and other sign languages worldwide. A few examples of these are: an up-and-down fist, which in ASL means "Yes"; an open index and middle finger moving to connect to an open thumb, which means "No"; a flat hand moving up a step, which means "Advance"; a flat and angled hand moving up and down; which means "Afternoon"; clenched fingers and open thumb moving to open fingers and an open thumb, which means "taxicab"; an index finger moving up in a roughly vertical direction, which means "up"; and so forth. These are but a few of many gestures that can be sensed as well as be mapped to particular devices or applications, such as the advance gesture to skip to another song on a web-based radio application, a next song on a compact disk playing on a stereo, or a next page or image in a file or album on a computer display or digital picture frame.

Three example intermediate radar fields are illustrated, the above-mentioned intermediate radar field 106-2 of FIG. 1, as well as two, room-sized intermediate radar fields in FIGS. 4 and 6, which are described below.

Returning to FIG. 2, radar-based gesture-recognition system 102 also includes a transmitting device configured to transmit gesture data to a remote device, though this need not be used when radar-based gesture-recognition system 102 is integrated with computing device 104. When included, gesture data can be provided in a format usable by a remote computing device sufficient for the remote computing device to determine the gesture in those cases where the gesture is not determined by radar-based gesture-recognition system 102 or computing device 104.

In more detail, radar-emitting element 212 can be configured to emit microwave radiation in a 1 GHz to 300 GHz range, a 3 GHz to 100 GHz range, and narrower bands, such as 57 GHz to 63 GHz, to provide the radar field. This range affects antenna element 214's ability to receive interactions, such as to follow locations of two or more targets to a resolution of about two to about 25 millimeters. Radar-emitting element 212 can be configured, along with other entities of radar-based gesture-recognition system 102, to have a relatively fast update rate, which can aid in resolution of the interactions.

By selecting particular frequencies, radar-based gesture-recognition system 102 can operate to substantially penetrate clothing while not substantially penetrating human tissue. Further, antenna element 214 or signal processor 216 can be configured to differentiate between interactions in the radar field caused by clothing from those interactions in the radar field caused by human tissue. Thus, a person wearing gloves or a long sleeve shirt that could interfere with sensing gestures with some conventional techniques, can still be sensed with radar-based gesture-recognition system 102.

Radar-based gesture-recognition system 102 may also include one or more system processors 220 and system media 222 (e.g., one or more computer-readable storage media). System media 222 includes system manager 224, which can perform various operations, including determining a gesture based on gesture data from signal processor 216, mapping the determined gesture to a pre-configured control gesture associated with a control input for an application associated with remote device 108, and causing transceiver 218 to transmit the control input to the remote device effective to enable control of the application (if remote). This is but one of the ways in which the above-mentioned control through radar-based gesture-recognition system 102 can be enabled. Operations of system manager 224 are provided in greater detail as part of methods 300 and 500 below.

Figure 8:
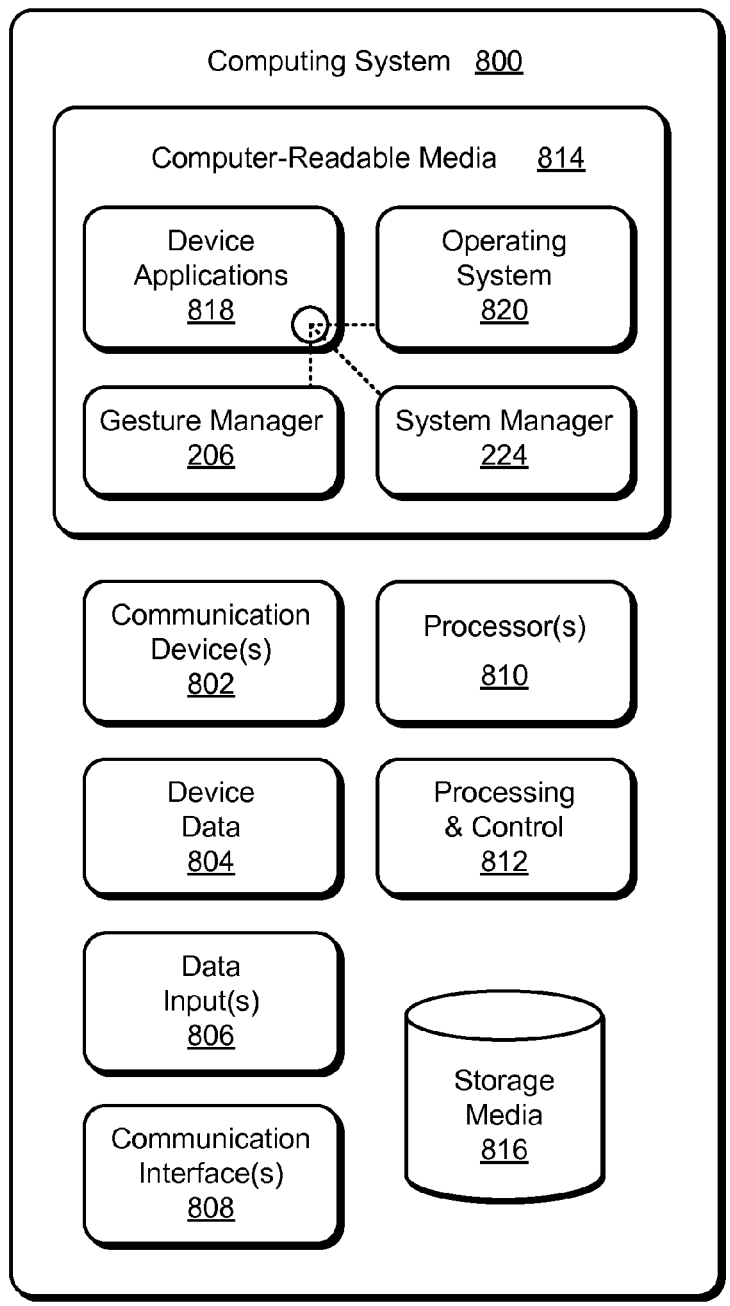
FIG. 8 illustrates an example computing system embodying, or in which techniques may be implemented that enable use of, radar-based gesture recognition.

These and other capabilities and configurations, as well as ways in which entities of FIGS. 1 and 2 act and interact, are set forth in greater detail below. These entities may be further divided, combined, and so on. The environment 100 of FIG. 1 and the detailed illustrations of FIGS. 2 and 8 illustrate some of many possible environments and devices capable of employing the described techniques.

Example Methods

Figure 3:
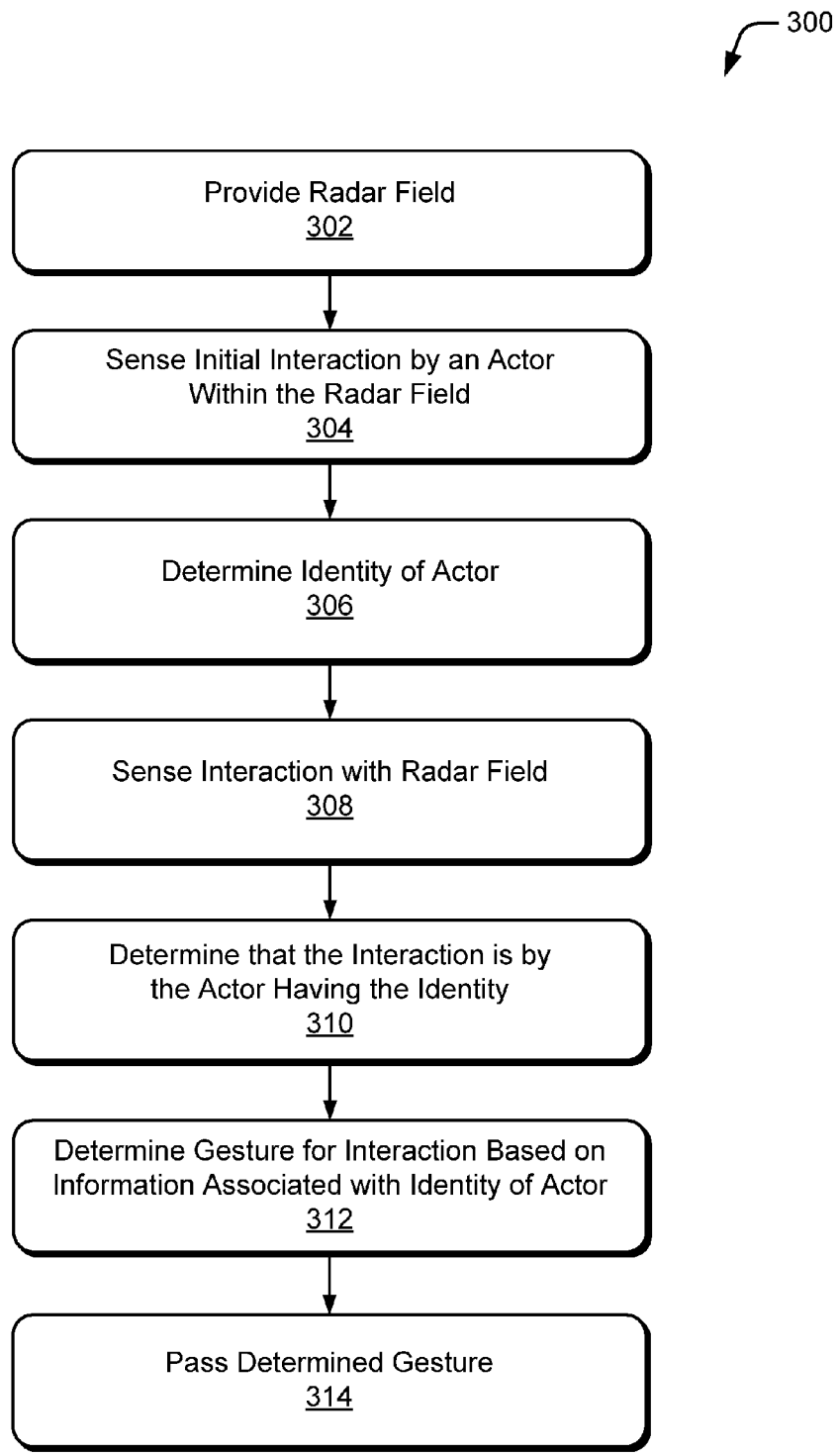
FIG. 3 illustrates an example method enabling radar-based gesture recognition, including by determining an identity of an actor in a radar field.
Figure 5:
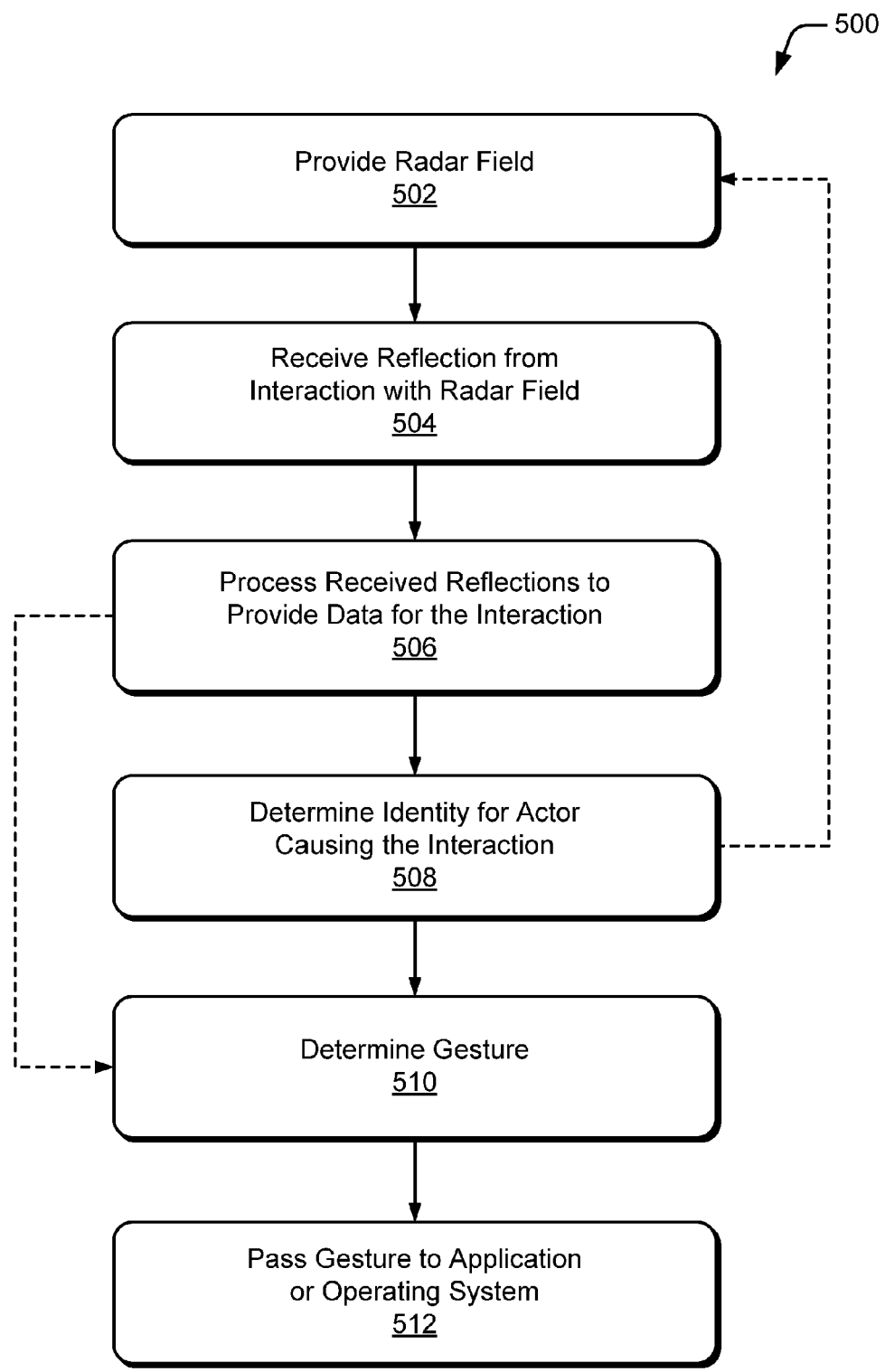
FIG. 5 illustrates an example method enabling radar-based gesture recognition through a radar field configured to penetrate fabric but reflect from human tissue.

FIGS. 3 and 5 depict methods enabling radar-based gesture recognition. Method 300 determines an identity of an actor and, with this identity, is better able to determine gestures performed within a radar field. Method 500 enables radar-based gesture recognition through a radar field configured to penetrate fabric but reflect from human tissue, and can be used separate from, or in conjunction with in whole or in part, method 300.

These methods are shown as sets of blocks that specify operations performed but are not necessarily limited to the order or combinations shown for performing the operations by the respective blocks. In portions of the following discussion reference may be made to environment 100 of FIG. 1 and as detailed in FIG. 2, reference to which is made for example only. The techniques are not limited to performance by one entity or multiple entities operating on one device.

At 302 a radar field is provided. This radar field can be caused by one or more of gesture manager 206, system manager 224, or signal processor 216. Thus, system manager 224 may cause radar-emitting element 212 of radar-based gesture-recognition system 102 to provide (e.g., project or emit) one of the described radar fields noted above.

At 304, one or more initial interactions by an actor in the radar field are sensed. These initial interactions can be those for one of the various gestures noted herein, or may simply being an interaction sufficient to determine a size or other identifying factor for the actor. The actor can be one of various elements that perform a gesture, such as a particular human finger, hand, or arm, and so forth. Further, with the radar field configured to reflect from human tissue and penetrate clothing and other obstructions, gesture manager 206 may more accurately determine the actor.

At 306, an identity of the actor is determined based on the one or more initial interactions in the radar field. These initial interactions can be gestures or other interactions, such as a person walking through a radar field and the gesture manager determining the person's height, arm circumference, weight, gate, or some radar-detectable item, such as the user's wearable computing device, mobile phone, and so forth.

At 308, an interaction in the radar field is sensed. This interaction is sensed through receiving a reflection of the emitted radar against the actor. This reflection can be from human tissue, for example. Details about the radar field and its operation are covered in greater detail as part of method 500 and in various example devices noted herein.

At 310, the interaction is determined to be by the actor having the identity. To do so, gesture manager 206 may follow the actor once the actor's identity is determined at 306. This following can be effective to differentiate the actor from other actors. By way of example, assume that an actor is determined to be a right hand of a particular person. The following can be effective to differentiate the right hand from the person's left hand, which aids in determining sensed interactions that may be overlapping or simply both be interacting with the radar field at once. The actors can also be whole persons so that gesture manager 206 may differentiate between interactions by one person from another.

Assume, for another example, that two persons are in a room and wishing to play a video game at the same time—one person driving one car in the game and another person driving another car. Gesture manager 206 enables following of both persons' interactions so that gestures from each are differentiated. This also aids in accurate gesture recognition for each based on information about each person, as noted in greater detail below.

At 312, a gesture corresponding to the interaction is determined based on information associated with the identity of the actor. This information aids in determining the gesture based on the interaction and can be of various types, from simply being an identified actor, and thus not some other actor or interference, or more-detailed information such as historical gesture variances based on the identifier actor.

Thus, in some cases a history of a particular actor, such as a particular person's right hand having a history of making back-and-forth movements with a small movement (e.g., a finger moving back-and-forth only two centimeters each way), can be used to determine the desired gesture for an interaction. Other types of information include physical characteristics of the actor, even if that information is not based on historic gestures. A heavy-set person's body movements will generate different data for a same intended gesture as a small, slight person, for example. Other examples include gestures specific to the actor (identity-specific gestures), such as a person selecting to pre-configure a control gesture to themselves. Consider a case where a user makes a grasping gesture that is cylindrical in nature with his right hand, like to grip a volume-control dial, and then proceeds to turn his hand in a clockwise direction. This control gesture can be configured to turn up a volume for various devices or applications, or be associated with a single device, such as to turn up volume only on a television or audio system.

At 314, the determined gesture is passed effective to enable the interaction with the radar field to control or otherwise interact with a device. For example, method 300 may pass the determined gesture to an application or operating system of a computing device effective to cause the application or operating system to receive an input corresponding to the determined gesture.

Concluding the example involving two persons playing a car-racing game, assume that both person's interactions are arm and body movements. Gesture manager 206 receives interactions from both persons, determines which person is which based on their identities, and determines what interactions correspond to what gestures, as well as a scale appropriate to those gestures, based on information about each person. Thus, if one person is a child, is physically small, and has a history of exaggerated movements, gesture manager 206 will base the gesture determined (and its scale—e.g., how far right is the child intending to turn the car) on the information about the child. Similarly, if the other persons is an adult, gesture manager 206 will based the gesture determined and its scale on the physical characteristics of the adult and a history of average-scale movements, for example.

Returning to the example of a pre-configured gesture to turn up a volume that is associated with a particular actor (here a particular person's right hand), the person's right hand is identified at 306 responsive to the person's right hand or the person generally interacting with a radar field at 304. Then, on sensing an interaction with the radar field at 308, gesture manager determines at 310 that the actor is the person's right hand and, based on information stored for the person's right hand as associated with the pre-configured gesture, determines at 312 that the interaction is the volume-increase gesture for a television. On this determination, gesture manager 206 passes the volume-increase gesture to the television, effective to cause the volume of the television to be increased.

Figure 4:
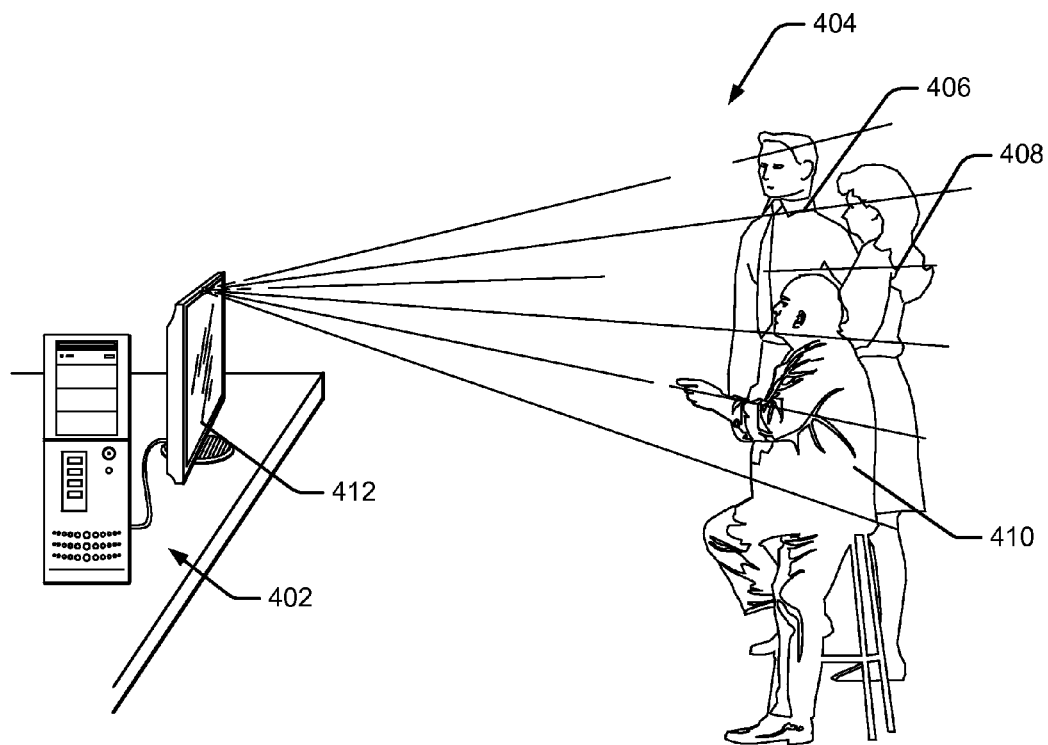
FIG. 4 illustrates an example radar field and three persons within the radar field.

By way of further example, consider FIG. 4, which illustrates a computing device 402, a radar field 404, and three persons, 406, 408, and 410. Each of persons 406, 408, and 410 can be an actor performing a gesture, though each person may include multiple actors—such as each hand of person 410, for example. Assume that person 410 interacts with radar field 404, which is sensed at operation 304 by radar-based gesture-recognition system 102, here through reflections received by antenna element 214 (shown in FIGS. 1 and 2). For this initial interaction person 410 may do little if anything explicitly, though explicit interaction is also permitted. Here person 410 simply walks in and sits down on a stool and by so doing walks into radar field 404. Antenna system 214 senses this interaction based on received reflections from person 410.

Radar-based gesture-recognition system 102 determines information about person 410, such as his height, weight, skeletal structure, facial shape and hair (or lack thereof). By so doing, radar-based gesture-recognition system 102 may determine that person 410 is a particular known person or simply identify person 410 to differentiate him from the other persons in the room (persons 406 and 408), performed at operation 310. After person 410's identity is determined, assume that person 410 gestures with his left hand to select to change from a current page of a slideshow presentation to a next page. Assume also that other persons 406 and 408 are also moving about and talking, and may interfere with this gesture of person 410, or may be making other gestures to the same or other applications, and thus identifying which actor is which can be useful as noted below.

Concluding the ongoing example of the three persons 406, 408, and 410 of FIG. 4, the gesture performed by person 410 is determined by gesture manager 206 to be a quick flip gesture (e.g., like swatting away a fly, analogous to a two-dimensional swipe on a touch screen) at operation 312. At operation 314, the quick flip gesture is passed to a slideshow software application shown on display 412, thereby causing the application to select a different page for the slideshow. As this and other examples noted above illustrate, the techniques may accurately determine gestures, including for in-the-air, three dimensional gestures and for more than one actor.

Method 500 enables radar-based gesture recognition through a radar field configured to penetrate fabric or other obstructions but reflect from human tissue. Method 500 can work with, or separately from, method 300, such as to use a radar-based gesture-recognition system to provide a radar field and sense reflections caused by the interactions described in method 300.

At 502, a radar-emitting element of a radar-based gesture-recognition system is caused to provide a radar field, such as radar-emitting element 212 of FIG. 2. This radar field, as noted above, can be a near or an intermediate field, such as from little if any distance to about 1.5 meters, or an intermediate distance, such as about one to about 30 meters. By way of example, consider a near radar field for fine, detailed gestures made with one or both hands while sitting at a desktop computer with a large screen to manipulate, without having to touch the desktop's display, images, and so forth. The techniques enable use of fine resolution or complex gestures, such as to "paint" a portrait using gestures or manipulate a three-dimensional computer-aided-design (CAD) images with two hands. As noted above, intermediate radar fields can be used to control a video game, a television, and other devices, including with multiple persons at once.

At 504, an antenna element of the radar-based gesture-recognition system is caused to receive reflections for an interaction in the radar field. Antenna element 214 of FIG. 2, for example, can receive reflections under the control of gesture manager 206, system processors 220, or signal processor 216.

At 506, a signal processor of the radar-based gesture-recognition system is caused to process the reflections to provide data for the interaction in the radar field. The reflections for the interaction can be processed by signal processor 216, which may provide gesture data for later determination as to the gesture intended, such as by system manager 224 or gesture manager 206. Note that radar-emitting element 212, antenna element 214, and signal processor 216 may act with or without processors and processor-executable instructions. Thus, radar-based gesture-recognition system 102, in some cases, can be implemented with hardware or hardware in conjunction with software and/or firmware.

Figure 6:
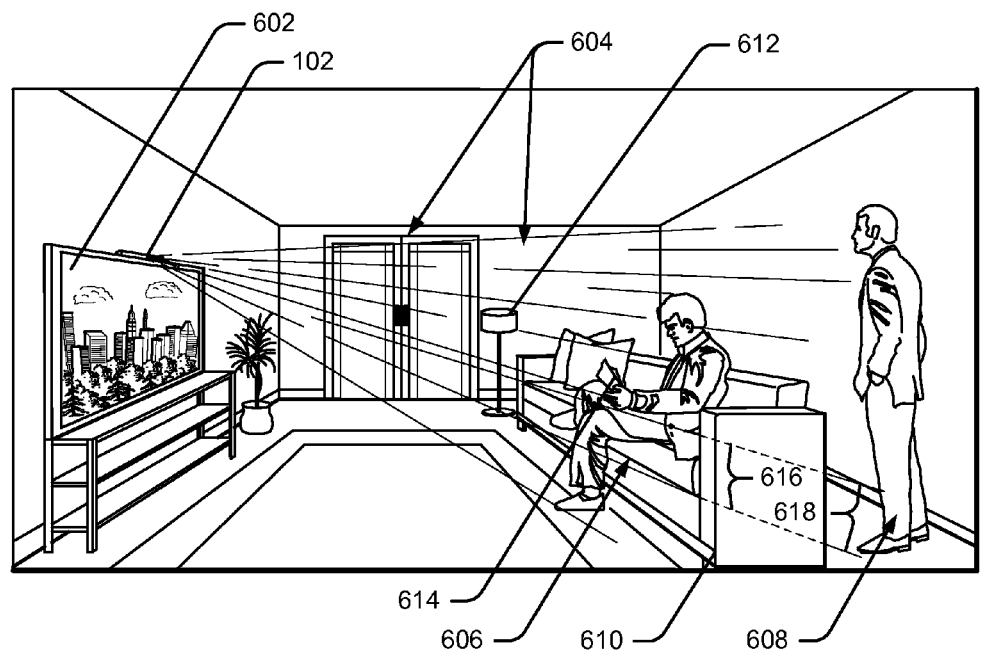
FIG. 6 illustrates a radar-based gesture-recognition system, a television, a radar field, two persons, and various obstructions, including a couch, a lamp, and a newspaper.

By way of illustration, consider FIG. 6, which shows radar-based gesture-recognition system 102, a television 602, a radar field 604, two persons 606 and 608, a couch 610, a lamp 612, and a newspaper 614. Radar-based gesture-recognition system 102, as noted above, is capable of providing a radar field that can pass through objects and clothing, but is capable of reflecting off human tissue. Thus, radar-based gesture-recognition system 102, at operations 502, 504, and 506, generates and senses gestures from persons even if those gestures are obscured, such as a body or leg gesture of person 608 behind couch 610 (radar shown passing through couch 610 at object penetration lines 616 and continuing at passed through lines 618), or a hand gesture of person 606 obscured by newspaper 614, or a jacket and shirt obscuring a hand or arm gesture of person 606 or person 608.

At 508, an identity for an actor causing the interaction is determined based on the provided data for the interaction. This identity is not required, but determining this identity can improve accuracy, reduce interference, or permit identity-specific gestures as noted herein.

After determining the identity of the actor, method 500 may proceed to 502 to repeat operations effective to sense a second interaction and then a gesture for the second interaction. In one case, this second interaction is based on the identity of the actor as well as the data for the interaction itself. This is not, however, required, as method 500 may proceed from 506 to 510 to determine, without the identity, a gesture at 510.

At 510 the gesture is determined for the interaction in the radar field. As noted, this interaction can be the first, second, or later interactions and based (or not based) also on the identity for the actor that causes the interaction.

Responsive to determining the gesture at 510, the gesture is passed, at 512, to an application or operation system effective to cause the application or operating system to receive input corresponding to the determined gesture. By so doing, a user may make a gesture to pause playback of media on a remote device (e.g., television show on a television), for example. In some embodiments, therefore, radar-based gesture-recognition system 102 and these techniques act as a universal controller for televisions, computers, appliances, and so forth.

As part of or prior to passing the gesture, gesture manager 206 may determine for which application or device the gesture is intended. Doing so may be based on identity-specific gestures, a current device to which the user is currently interacting, and/or based on controls through which a user may interaction with an application. Controls can be determined through inspection of the interface (e.g., visual controls), published APIs, and the like.

Figure 7:
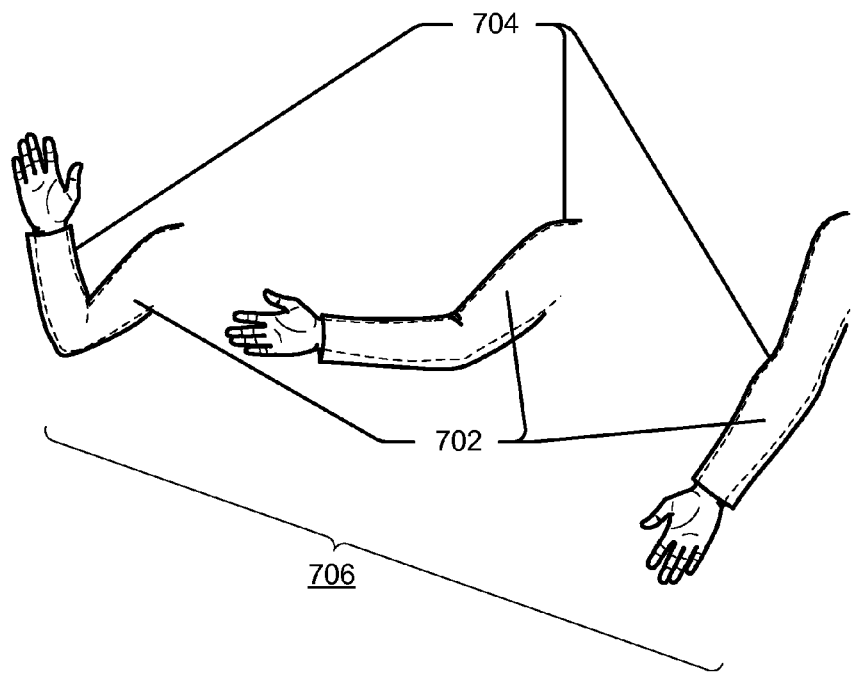
FIG. 7 illustrates an example arm in three positions and obscured by a shirt sleeve.
Figure 7:
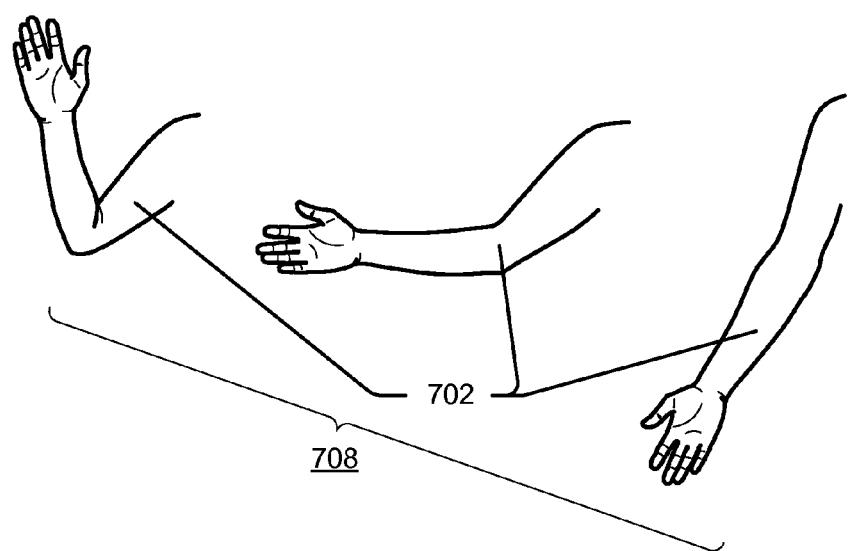

As noted in part above, radar-based gesture-recognition system 102 provides a radar field capable of passing through various obstructions but reflecting from human tissue, thereby potentially improving gesture recognition. Consider, by way of illustration, an example arm gesture where the arm performing the gesture is obscured by a shirt sleeve. This is illustrated in FIG. 7, which shows arm 702 obscured by shirt sleeve 704 in three positions at obscured arm gesture 706. Shirt sleeve 704 can make more difficult or even impossible recognition of some types of gestures with some convention techniques. Shirt sleeve 704, however, can be passed through and radar reflected from arm 702 back through shirt sleeve 704. While somewhat simplified, radar-based gesture-recognition system 102 is capable of passing through shirt sleeve 704 and thereby sensing the arm gesture at unobscured arm gesture 708. This enables not only more accurate sensing of movements, and thus gestures, but also permits ready recognition of identities of actors performing the gesture, here a right arm of a particular person. While human tissue can change over time, the variance is generally much less than that caused by daily and seasonal changes to clothing, other obstructions, and so forth.

In some cases method 300 or 500 operates on a device remote from the device being controlled. In this case the remote device includes entities of computing device 104 of FIGS. 1 and 2, and passes the gesture through one or more communication manners, such as wirelessly through transceivers and/or network interfaces (e.g., network interface 208 and transceiver 218). This remote device does not require all the elements of computing device 104—radar-based gesture-recognition system 102 may pass gesture data sufficient for another device having gesture manager 206 to determine and use the gesture.

Operations of methods 300 and 500 can be repeated, such as by determining for multiple other applications and other controls through which the multiple other applications can be controlled. Methods 500 may then indicate various different controls to control various applications associated with either the application or the actor. In some cases, the techniques determine or assign unique and/or complex and three-dimensional controls to the different applications, thereby allowing a user to control numerous applications without having to select to switch control between them. Thus, an actor may assign a particular gesture to control one software application on computing device 104, another particular gesture to control another software application, and still another for a thermostat or stereo. This gesture can be used by multiple different persons, or may be associated with that particular actor once the identity of the actor is determined.

The preceding discussion describes methods relating to radar-based gesture recognition. Aspects of these methods may be implemented in hardware (e.g., fixed logic circuitry), firmware, software, manual processing, or any combination thereof. These techniques may be embodied on one or more of the entities shown in FIGS. 1, 2, 4, 6, and 8 (computing system 800 is described in FIG. 8 below), which may be further divided, combined, and so on. Thus, these figures illustrate some of the many possible systems or apparatuses capable of employing the described techniques. The entities of these figures generally represent software, firmware, hardware, whole devices or networks, or a combination thereof.

Example Computing System

FIG. 8 illustrates various components of example computing system 800 that can be implemented as any type of client, server, and/or computing device as described with reference to the previous FIGS. 1-7 to implement radar-based gesture recognition.

Computing system 800 includes communication devices 802 that enable wired and/or wireless communication of device data 804 (e.g., received data, data that is being received, data scheduled for broadcast, data packets of the data, etc.). Device data 804 or other device content can include configuration settings of the device, media content stored on the device, and/or information associated with a user of the device (e.g., an identity of an actor performing a gesture). Media content stored on computing system 800 can include any type of audio, video, and/or image data. Computing system 800 includes one or more data inputs 806 via which any type of data, media content, and/or inputs can be received, such as human utterances, interactions with a radar field, user-selectable inputs (explicit or implicit), messages, music, television media content, recorded video content, and any other type of audio, video, and/or image data received from any content and/or data source.

Computing system 800 also includes communication interfaces 808, which can be implemented as any one or more of a serial and/or parallel interface, a wireless interface, any type of network interface, a modem, and as any other type of communication interface. Communication interfaces 808 provide a connection and/or communication links between computing system 800 and a communication network by which other electronic, computing, and communication devices communicate data with computing system 800.

Computing system 800 includes one or more processors 810 (e.g., any of microprocessors, controllers, and the like), which process various computer-executable instructions to control the operation of computing system 800 and to enable techniques for, or in which can be embodied, radar-based gesture recognition. Alternatively or in addition, computing system 800 can be implemented with any one or combination of hardware, firmware, or fixed logic circuitry that is implemented in connection with processing and control circuits which are generally identified at 812. Although not shown, computing system 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 800 also includes computer-readable media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 800 can also include a mass storage media device (storage media) 816.

Computer-readable media 814 provides data storage mechanisms to store device data 804, as well as various device applications 818 and any other types of information and/or data related to operational aspects of computing system 800. For example, an operating system 820 can be maintained as a computer application with computer-readable media 814 and executed on processors 810. Device applications 818 may include a device manager, such as any form of a control application, software application, signal-processing and control module, code that is native to a particular device, a hardware abstraction layer for a particular device, and so on. Device applications 818 also include system components, engines, or managers to implement radar-based gesture recognition, such as gesture manager 206 and system manager 224.

Conclusion

Although embodiments of techniques using, and apparatuses including, radar-based gesture recognition have been described in language specific to features and/or methods, it is to be understood that the subject of the appended claims is not necessarily limited to the specific features or methods described. Rather, the specific features and methods are disclosed as example implementations of radar-based gesture recognition.

What is claimed is:

1. A computer-implemented method comprising:
providing, through a radar-based gesture-recognition system, a radar field;
sensing, through the radar-based gesture-recognition system, one or more initial interactions by an actor in the radar field, the actor being one of a particular human finger, hand, or arm;
determining, based on the one or more initial interactions in the radar field, an identifying factor, the identifying factor including a height, weight, skeletal structure, facial shape, or hair of the actor;
associating the identifying factor with an identity, the identity identifying the actor; and
storing the identity of the actor with the identifying factor for the actor, the identifying factor enabling identification of an unknown actor through comparison of a second identifying factor with the identifying factor, the second identifying factor sensed by the radar-based gesture-recognition system or another radar-based gesture-recognition system, the identifying factor and the second identifying factor being equivalent features of the actor and the unknown actor.

2. The computer-implemented method as described in claim 1, the method further comprising sensing, through the radar-based gesture recognition system, an interaction and determining that the interaction is by the actor having the identity, wherein determining that the interaction is by the actor having the identity follows the actor using the radar-based gesture-recognition system, the following effective to differentiate the actor from other actors.

3. The computer-implemented method as described in claim 2, wherein the interaction is an arm or body movement of the actor and the method further comprises:
   determining, based on information associated with the identity of the actor, a gesture corresponding to the interaction:
   receiving a second interaction;
   determining that the second interaction is by one of the other actors having the second identifying factor, the one of the other actors associated with a second identity;
   determining, based on second information associated with the second person, a second gesture corresponding to the second interaction; and
   providing the gesture and the second gesture effective to cause an application or operating system to receive first and second inputs associated with the first gesture and the second gesture, respectively.

4. The computer-implemented method as described in claim 1, further comprising:
   sensing, through the radar-based gesture-recognition system, an interaction;
   determining that the interaction is by the actor having the identity;
   determining, based on information associated with the identity, a gesture corresponding to the interaction; an
   passing the determined gesture to an application or operating system of a computing device performing the method effective to cause the application or operating system to receive an input corresponding to the determined gesture.

5. The computer-implemented method as described in claim 4, wherein the information aids in determining the gesture based on the interaction, the information indicating historical gesture variances or physical characteristics of the actor affecting determination of the gesture.

6. The computer-implemented method as described in claim 4, wherein determining the gesture corresponding to the interaction maps, based on the information associated with the identity of the actor, the interaction to an identity-specific gesture associated with the actor.

7. The computer-implemented method as described in claim 6, wherein the identity-specific gesture is a pre-configured control gesture uniquely associated with the actor and an application, and the method further comprises passing the pre-configured control gesture to the application effective to cause the application to be controlled by the identity-specific gesture.

8. The computer-implemented method as described in claim 4, further comprising determining that the gesture is associated with a remote device and passing the gesture to the remote device.

9. The computer-implemented method as described in claim 4, wherein at least a portion of the interaction includes reflections from human tissue having a layer of material interposed between the radar-based gesture-recognition system and the human tissue, the layer of material including glass, wood, nylon, cotton, or wool.

10. The computer-implemented method as described in claim 1, wherein the radar-based gesture-recognition system is associated with a computing device that performs the method, the radar field is a near radar field, and the interaction is sensed over a range extending from one millimeter to 1.5 meters from a display of the computing device.

11. The computer-implemented method as described in claim 4, wherein the information associated with the identity indicates a physical size of the actor or a scale for gestures performed by the actor, and wherein determining the gesture corresponding to the interaction is based on the physical size or the scale for gestures.

12. A radar-based gesture-recognition system comprising:
   a radar-emitting element configured to provide a radar field, the radar field configured to penetrate fabric and reflect from human tissue;
   an antenna element configured to receive reflections from multiple human tissue targets including hands, arms, legs, head, or body from a same or different person within the radar field; and
   a signal processor configured to:
   process the received reflections from the multiple human tissue targets within the radar field sufficient to differentiate the multiple human tissue targets from one another;
   determine, based on the received reflections, an identifying factor, the identifying factor including a height, weight, skeletal structure, facial shape or hair of a first human tissue target of the multiple human tissue targets;
   associate the identifying factor with an identity of the first human tissue target of the multiple human tissue targets;
   store the identity and the identifying factor of the first human tissue target of the multiple human tissue targets, the identifying factor enabling identification of a second human tissue target of the multiple human tissue targets through comparison of the first human tissue target identifying factor with a second identifying factor associated with the second human tissue target,
   the identifying factor and the second identifying factor being equivalent features of the first human tissue target and the second human tissue target; and
   provide gesture data usable to determine a gesture from the first human tissue target of the multiple human tissue targets.

13. The radar-based gesture-recognition system of claim 12, wherein the multiple human tissue targets are different hands of a same person.

14. The radar-based gesture-recognition system of claim 12, wherein the multiple human tissue targets are hands of different persons and differentiating the first human tissue target of the multiple human tissue targets from the second human tissue target of the multiple human tissue targets is effective to provide gesture data for one of the different persons.

15. The radar-based gesture-recognition system of claim 12, wherein the radar field is about one to about ten meters in depth and the antenna element or the signal processor are configured to process the received reflections to provide large-body gestures based on reflections from human tissue caused by body, arm, or leg movements.

16. The radar-based gesture-recognition system of claim 12, wherein the radar- emitting element provides the radar field in a three-dimensional volume, the antenna element is capable of receiving reflections in the three-dimensional volume, and the signal processor is configured to process the received reflections in the three-dimensional volume sufficient to provide gesture data usable to determine gestures in three dimensions.

17. An apparatus comprising:
a radar-based gesture-recognition system comprising:
- a radar-emitting element configured to provide a radar field, the radar field configured to penetrate fabric and reflect from human tissue targets including hands, arms, legs, head, or body of a person;
- an antenna element configured to receive reflections from the human tissue targets that are within the radar field; and
- a signal processor configured to process the received reflections from the human tissue targets within the radar field to provide data associated with the received reflections;

one or more computer processors; and
one or more non-transitory computer-readable storage media having instructions stored thereon that, responsive to execution by the one or more computer processors, perform operations comprising:
causing the radar-based gesture-recognition system to provide a radar field with the radar-emitting element;
causing the radar-based gesture-recognition system to receive first reflections for a first interaction in the radar field with the antenna element such as a hand, arm, leg or body movement, the first interaction including an actor interacting with the radar field, the actor being one of a particular human finger, hand, arm, head or leg;
causing the signal processor to process the first received reflections to provide data for the first interaction;
determining, based on the provided data for the first interaction,
an identifying factor, the identifying factor including a height, skeletal structure, facial shape, or hair of the actor causing the first interaction;
associating the identifying factor with an identity, the identity identifying the actor; and
storing the identity of the actor and the identifying factor, the identifying factor enabling identification of an unknown actor through comparison of a second identifying factor with the identifying factor, the second identifying factor sensed by the radar-based gesture-recognition system or another radar-based gesture-recognition system, the identifying factor and the second identifying factor being equivalent features of the actor and the unknown actor.

18. The computer-implemented method as described in claim 1, further comprising determining, based on the one or more initial interactions in the radar field, another actor with another identifying factor, the other identifying factor including a height, weight, skeletal structure, facial shape, or hair of the other actor.

19. The computer-implemented method as described in claim 1, wherein the sensing occurs when the actor generally interacts with the radar field, and wherein generally interacting with the radar field need not comprise directly facing a particular component of the radar-based gesture-recognition system.

20. The computer-implemented method as described in claim 19, wherein the actor passes through the radar field.

* * * * *

UNITED STATES PATENT AND TRADEMARK OFFICE
CERTIFICATE OF CORRECTION

PATENT NO.        : 9,921,660 B2
APPLICATION NO.   : 14/504038
DATED             : March 20, 2018
INVENTOR(S)       : Ivan Poupyrev It is certified that error appears in the above-identified patent and that said Letters Patent is hereby corrected as shown below:

In the Claims

Column 12, Line 63, after "identity" before "the" delete "of the actor with" insert --and--
Column 12, Line 64, before "," delete "for the actor"
Column 13, Line 17, after "identity" before "," delete "of the actor"
Column 13, Line 18, after "interaction" delete ":" insert --;--
Column 13, Line 25, after "second" before "," delete "person" insert --identity--
Column 13, Line 38, after ";" delete "an" insert --and--
Column 13, Lines 47-48, after "characteristics" before "determination" delete "of the actor affecting" insert --associated with the identity that affects--
Column 13, Line 52, after "identity" before "," delete "of the actor"
Column 13, Line 53, after "the" before "." delete "actor" insert --identity--
Column 13, Line 56, after "the" delete "actor" insert --identity--
Column 14, Line 23, after "person" insert --that are--
Column 14, Line 32, after "shape" before "or" insert --,--
Column 14, Line 42, after "the" before "first" insert --identifying factor of the--
Column 14, Line 43, after "target" before "with" delete "identifying factor"
Column 14, Line 66, after "gestures" before "based" insert --also--
Column 16, Line 11, after "identity" before "and" delete "of the actor"

Signed and Sealed this
Twenty-ninth Day of May, 2018

Andrei Iancu
*Director of the United States Patent and Trademark Office*

Page 1 of 1